US011249664B2

(12) United States Patent
Hahn et al.

(10) Patent No.: US 11,249,664 B2
(45) Date of Patent: Feb. 15, 2022

(54) FILE SYSTEM METADATA DECODING FOR OPTIMIZING FLASH TRANSLATION LAYER OPERATIONS

(71) Applicant: Western Digital Technologies, Inc., San Jose, CA (US)

(72) Inventors: Judah Gamliel Hahn, Ofra (IL); Vinay Vijendra Kumar Lakshmi, Bangalore (IN)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 118 days.

(21) Appl. No.: 16/452,320

(22) Filed: Jun. 25, 2019

(65) Prior Publication Data

US 2020/0110537 A1   Apr. 9, 2020

Related U.S. Application Data

(60) Provisional application No. 62/743,440, filed on Oct. 9, 2018.

(51) Int. Cl.
  *G06F 3/06*  (2006.01)
  *G06F 12/02* (2006.01)
  *G06F 16/906* (2019.01)
  *G06F 16/907* (2019.01)
  *G06F 9/30* (2018.01)

(52) U.S. Cl.
  CPC ............ *G06F 3/064* (2013.01); *G06F 3/0619* (2013.01); *G06F 3/0658* (2013.01); *G06F 3/0679* (2013.01); *G06F 9/30029* (2013.01); *G06F 12/0246* (2013.01); *G06F 16/906* (2019.01); *G06F 16/907* (2019.01); *G06F 2212/7201* (2013.01)

(58) Field of Classification Search
None
See application file for complete search history.

(56) References Cited

U.S. PATENT DOCUMENTS 5,890,211 A   3/1999 Sokolov et al.
6,092,154 A   7/2000 Curtis et al.
(Continued)

OTHER PUBLICATIONS

NPL_Getting to know the Solaris filesystem, Part 1—SunWorld—May 1999 (Year: 1999).*
(Continued)

*Primary Examiner* — Tracy C Chan
(74) *Attorney, Agent, or Firm* — Loza & Loza, LLP; Gabriel Fitch

(57) ABSTRACT

Methods, apparatus and systems for data storage devices that include non-volatile memory (NVM) are described. One such apparatus includes a non-volatile memory, a data storage device controller configured to receive a command from a host device, and wherein the data storage device controller comprises a file system analyzer comprising a determination circuit configured to determine based on the command from the host device whether a logical block address (LBA) referenced in the command is part of a known file extent, and a selection circuit configured to select a flash translation layer (FTL) workflow for the file extent in response to the determination that the LBA referenced in the command is part of the known file extent.

20 Claims, 14 Drawing Sheets

(56) References Cited

U.S. PATENT DOCUMENTS

| | | | |
|---|---|---|---|
| 7,743,038 B1 | 6/2010 | Goldick | |
| 7,937,393 B2 | 5/2011 | Prahlad et al. | |
| 8,275,946 B1 | 9/2012 | Smith | |
| 8,775,741 B1 | 7/2014 | De La Iglesia | |
| 8,984,097 B1* | 3/2015 | Shyam | G06F 16/178 709/218 |
| 10,228,854 B2* | 3/2019 | Romanovsky | G06F 3/0643 |
| 2003/0188184 A1 | 10/2003 | Strongin et al. | |
| 2006/0106984 A1 | 5/2006 | Bartley et al. | |
| 2006/0179236 A1 | 8/2006 | Shafi | |
| 2006/0218637 A1* | 9/2006 | Thomas | G06F 21/51 726/23 |
| 2007/0266037 A1 | 11/2007 | Terry et al. | |
| 2008/0320211 A1 | 12/2008 | Kinoshita | |
| 2009/0031083 A1 | 1/2009 | Willis et al. | |
| 2009/0228875 A1 | 9/2009 | Devries | |
| 2010/0262721 A1 | 10/2010 | Asnaashari et al. | |
| 2011/0296088 A1 | 12/2011 | Duzly et al. | |
| 2011/0320685 A1 | 12/2011 | Gorobets et al. | |
| 2012/0051137 A1 | 3/2012 | Hung et al. | |
| 2012/0144092 A1 | 6/2012 | Hsieh et al. | |
| 2012/0233434 A1* | 9/2012 | Starks | G06F 3/0673 711/170 |
| 2012/0284587 A1 | 11/2012 | Yu et al. | |
| 2012/0317335 A1 | 12/2012 | Cho | |
| 2013/0024609 A1 | 1/2013 | Gorobets et al. | |
| 2013/0080732 A1 | 3/2013 | Nellans et al. | |
| 2013/0086311 A1 | 4/2013 | Huang et al. | |
| 2013/0138867 A1 | 5/2013 | Craft et al. | |
| 2013/0191349 A1 | 7/2013 | Akirav et al. | |
| 2013/0262533 A1 | 10/2013 | Mitra et al. | |
| 2013/0262736 A1 | 10/2013 | Kegel et al. | |
| 2013/0275672 A1 | 10/2013 | Bert | |
| 2013/0297852 A1 | 11/2013 | Fai et al. | |
| 2014/0082324 A1 | 3/2014 | Elhamias et al. | |
| 2014/0149641 A1 | 5/2014 | Avila et al. | |
| 2014/0289492 A1 | 9/2014 | Ranjith Reddy et al. | |
| 2014/0337560 A1* | 11/2014 | Chun | G06F 12/0246 711/103 |
| 2015/0199269 A1 | 7/2015 | Bert et al. | |
| 2015/0220552 A1* | 8/2015 | Duzly | G06F 16/1724 707/693 |
| 2015/0324300 A1* | 11/2015 | Sampathkumar | G06F 12/0871 711/136 |
| 2015/0356020 A1 | 12/2015 | Desai et al. | |
| 2016/0026406 A1 | 1/2016 | Hahn et al. | |
| 2016/0054931 A1 | 2/2016 | Romanovsky et al. | |
| 2016/0054934 A1* | 2/2016 | Hahn | G06F 12/0246 711/103 |
| 2016/0070495 A1* | 3/2016 | Periyagaram | G06F 3/0619 711/159 |
| 2016/0092352 A1* | 3/2016 | Camp | G06F 3/064 711/103 |
| 2016/0246726 A1 | 8/2016 | Hahn | |
| 2016/0274797 A1* | 9/2016 | Hahn | G06F 3/061 |
| 2017/0091022 A1* | 3/2017 | Khan | G06F 3/0688 |
| 2017/0286442 A1* | 10/2017 | Xie | G06F 16/185 |
| 2019/0294356 A1* | 9/2019 | Caraccio | G06F 3/0611 |
| 2020/0081837 A1* | 3/2020 | Kaushikkar | G06F 12/0815 |

OTHER PUBLICATIONS

Hahn, et al., Office Action dated Dec. 14, 2017 for U.S. Appl. No. 15/050,364.

Romanovsky, et al., Office Action dated Aug. 9, 2017 for U.S. Appl. No. 14/555,548.

Hahn, Judah G. et al., Non-Final Office Action dated May 10, 2017 for U.S. Appl. No. 15/050,364.

Romanovsky, et al., Final Office Action dated Jan. 25, 2017 for U.S. Appl. No. 14/555,548.

Notice of Allowance and Fees Due for U.S. Appl. No. 14/297,563 (dated Jul. 25, 2016).

Non-Final Office Action for U.S. Appl. No. 14/555,548 (dated Jul. 5, 2016).

"NVM Express," Specification Revision 1.2.1, http://nvmexpress.org/wpcontent/uploads/NVM_Express_1_2_1_Gold_20160603.pdf, pp. 1-217 (Jun. 5, 2016).

Final Office Action for U.S. Appl. No. 14/297,563 (dated Apr. 13, 2016).

Non-Final Office Action for U.S. Appl. No. 14/814,460 (dated Mar. 28, 2016).

Prabhakaran et al., "Analysis and Evolution of Journaling File Systems," 2005 USENIX Annual Technical Conference, pp. 105-120 (2005).

Commonly-Assigned, co-pending U.S. Appl. No. 14/977,559 for "Methods, Systems, and Computer Readable Media for Automatically and Selectively Enabling Burst Mode Operation in a Storage Device" (Unpublished, filed Dec. 21, 2015).

Non-Final Office Action for U.S. Appl. No. 14/297,563 (dated Dec. 4, 2015).

"NVM Express Overview," NVM Express, pp. 1-2 (copyright 2013).

"Understanding the Flash Translation Layer (FTL) Specification," AP-684 Application Note, Intel, pp. 1-20 (Dec. 1998).

"Ext4 Disk Layout," https://ext4.wiki.kernel.org/index.php/Ext4_Disk_Layout, Wikipedia, pp. 1-28 (Nov. 17, 2014).

"CreateFile function," Microsoft, Windows Dev Center, https://msdn.microsoft.com/enus/library/windows/desktop/aa363858(v=vs 85).aspx, pp. 1-20 (2008).

"NVM Express," Specification Revision 1.2, http://nvmexpress.org/wpcontent/uploads/NVM_Express_1_2_Gold_20141209.pdf, pp. 1-205 (Nov. 3, 2014).

"I/O Limits: block sizes, alignment and I/O hints," Red Hat, http://people.redhat.com/msnitzer/docs/io-limits.txt, pp. 1-4, (Jan. 14, 2013).

Commonly-Assigned, co-pending U.S. Appl. No. 14/555,548 for "Storage Devices and Methods for Optimizing Use of Storage Devices Based on Storage Device Parsing of File System Metadata in Host Write Operations," (Unpublished, filed Nov. 26, 2014).

Hahn, et al., Office Action dated Aug. 25, 2017 for U.S. Appl. No. 14/464,584.

Non-Final Office Action for U.S. Appl. No. 14/464,584 (dated Nov. 18, 2016).

Notice of Allowance and Fees Due for U.S. Appl. No. 14/814,460 (dated Sep. 23, 2016).

Final Office Action for U.S. Appl. No. 14/464,584 (dated Apr. 26, 2016).

Non-Final Office Action for U.S. Appl. No. 14/464,584 (dated Dec. 4, 2015).

"NVM Express: Revision 1.3a," https://nvmexpress.org/wp-content/uploads/NVM-Express-1_3a-20171024_ratified.pdf (Oct. 24, 2017).

Trautman et al, "Scalability and Performance in Modem File Systems"; accessed Jun. 24, 2019; 10 pages; http://www.siliconbunny.com/downloads/xfs_white_paper.html.

Miller, Barton P., "CS 537 Notes, Section #26: Windows (NT) File System"; accessed Jun. 24, 2019; 5 pages; http://pages.cs.wisc.edu/~bart/537/lecturenotes/s26.html.

* cited by examiner

FIG. 10

FILE SYSTEM METADATA DECODING FOR OPTIMIZING FLASH TRANSLATION LAYER OPERATIONS

CROSS-REFERENCE TO RELATED APPLICATION(S)

This application which claims priority to and the benefit of U.S. Provisional Application No. 62/743,440, filed on Oct. 9, 2018, and entitled, "FILE SYSTEM METADATA DECODING FOR OPTIMIZING FLASH TRANSLATION LAYER OPERATIONS", the entire content of which is incorporated herein by reference.

FIELD

The subject matter described herein relates to non-volatile flash memory devices and, in particular, file system metadata decoding in order to optimize flash translation layer operations in non-volatile memories.

INTRODUCTION

In data storage devices employing non-volatile memory (NVM), such as NAND-type flash memory devices, controllers for managing such devices typically include a flash translation (e.g., a flash translation layer (FTL) or FTL manager) that maps logical block addresses (LBAs) used by a host accessing the memory device into physical addresses within the NAND flash memory in order to emulate a block device interface to support conventional disk-based file systems. Furthermore, memory controllers also include a logical layer of firmware and/or software that is used to determine the optimal mix of operations for flash memory maintenance and for flash translation. In particular, for NVM storage devices, such as a solid state devices (SSDs), such devices may be configured to try to predict what a host device will do in terms or write or read commands. For example, there are known firmware implemented heuristics used in consumer SSDs that perform a pattern analysis (e.g., stream detection) of how a host device is sending commands, such as whether write requests are sequential or random, as an example. Other devices, such as embedded flash storage in cameras, are known to include burst detection designed to quickly clear large single level cell (SLC) partitions, or known enterprise storage systems that utilize host-defined streams to separate different data segments in order to improve FTL operation. A need exists, however, for further optimization of FTL workflow operation in data storage devices.

SUMMARY

The following presents a simplified summary of some aspects of the disclosure to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present various concepts of some aspects of the disclosure in a simplified form as a prelude to the more detailed description that is presented later.

One embodiment of the disclosure provides a data storage device comprising: a non-volatile memory; a data storage device controller configured to receive a command from a host device; and wherein the data storage device controller comprises a file system analyzer comprising: a determination circuit configured to determine based on the command from the host device whether a logical block address (LBA) referenced in the command is part of a known file extent; and a selection circuit configured to select a flash translation layer (FTL) workflow for the file extent in response to the determination that the LBA referenced in the command is part of the known file extent.

Another embodiment of the disclosure provides a data storage device comprising: a flash memory; and a data storage device controller configured to: receive a command from a host device accessing the flash memory; determine from the command whether logical block addresses (LBAs) referenced in the command are within a known file extent having an associated range of LBAs; and select a particular operation used by a flash translation layer (FTL) manager in the data storage device controller for controller operations for the known file extent when the LBAs referenced in the command are determined to be within the known file extent.

Yet another embodiment of the disclosure provides a method comprising: receiving a command in a data storage device from a host device; determining from the command whether a logical block address (LBA) associated with the command is part of a known file extent; and selecting a particular flash translation layer (FTL) operation for the known file extent in response to the known file extent comprising the LBA associated with the command.

Yet another embodiment of the disclosure provides a solid state device (SSD) comprising: means for receiving a write command from a host device; means for determining, upon receipt of the write command, whether a logical block address (LBA) referenced in the write command is part of a known file extent; and means for selecting a workflow for the known file extent if the LBA referenced in the command is part of the known file extent.

BRIEF DESCRIPTION OF THE DRAWINGS

Embodiments of the subject matter described herein will now be explained with reference to the accompanying drawings, wherein like reference numerals represent like parts.

FIG. 10 is a diagram illustrating extents as used in the present methods and apparatus.

DETAILED DESCRIPTION

Subject matter described herein includes methods, systems, and computer readable media for automatically deriving hints from accesses to a data storage device and from file system metadata and for optimizing utilization of the data storage device based on the hints. The operations described herein are performed at the data storage device level, for example, using a hardware or firmware hint derivation circuit that automatically detects patterns in data that is written to a data storage device and derives hints from the patterns regarding how data will likely be accessed by a host. The hint derivation circuit may also utilize frequency of accesses to memory locations and file system metadata to derive hints and to determine how to best optimize utilization of data storage device resources. Furthermore, the subject matter disclosed herein also includes apparatus and methods that optimize operation of an NVM memory device by prioritizing FTL operations or workflow based on region writes derived from file system metadata.

Exemplary Data Storage Devices

Figure 1:
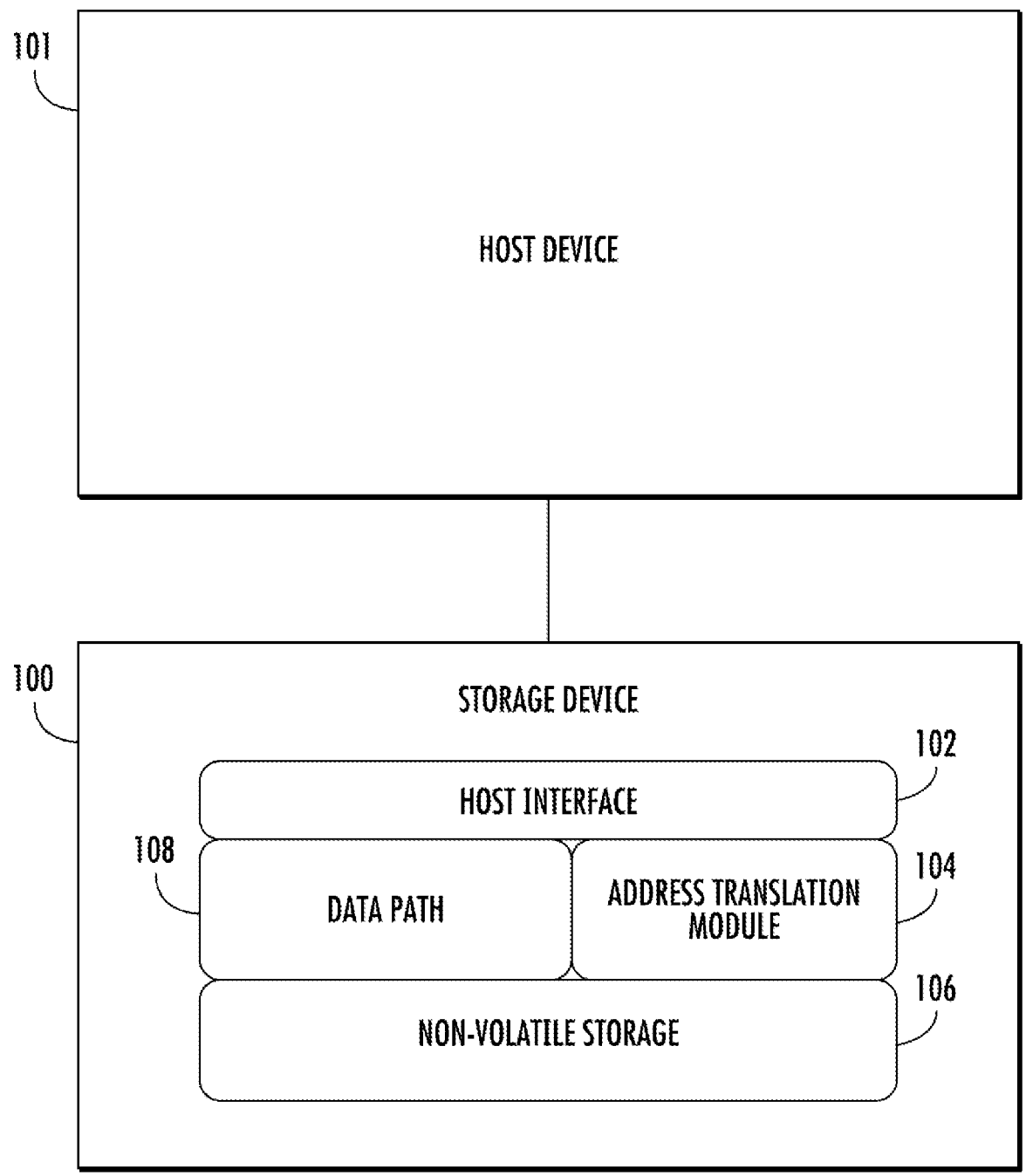
FIG. 1 is a block diagram illustrating an exemplary operating environment for the subject matter described herein.

FIG. 1 is a block diagram of an exemplary operating environment in which the hint derivation and data storage device utilization optimization methods described herein may be used. Referring to FIG. 1, a data storage device 100 provides non-volatile storage for a host device 101. Data storage device 100 may be any suitable device that incorporates non-volatile memory and that allows access to that memory by a host device. In one example, data storage device 100 may be a NAND flash device. However, other data storage devices may also be used within the scope of the subject matter described herein. For example, data storage device 100 may be a NOR flash device, a solid state drive that incorporates NOR and/or NAND flash memory, or a device that combines solid state storage with disk storage.

Data storage device 100 may include hardware, software, and firmware components. For example, data storage device 100 typically includes a storage controller that controls access by host device 101 to non-volatile memory storage.

As described above, data storage device 100 may also include hardware or firmware components that implement hint derivation and storage device utilization optimization as described herein. These components will be described in more detail below.

In the illustrated example, data storage device 100 includes a host interface 102 for interfacing with host device 101. Host interface 102 may be any suitable interface for handling I/O operations between host device 101 and non-volatile memory. For example, host interface 102 may be a SATA interface, a peripheral component interface express (PCIe) interface, or any other suitable interface for receiving I/O commands from a host system. An address translation module 104 translates from the address space by the host to the address space used by data storage device 100 to access non-volatile storage 106. In one example, host device 101 may use logical addressing by specifying logical block addresses (LBAs) in I/O operations to data storage device 100, data storage device 100 may use physical addressing to specify memory locations, and address translation module 104 may translate between the logical address space and the physical address space Non-volatile storage 106 may comprise the physical memory cells where data is stored. For example, in the case of flash memory, non-volatile storage 106 may include NAND or NOR flash memory cells in two-dimensional, three-dimensional, or combinations of two-dimensional and three-dimensional configurations. As stated above, non-volatile storage 106 may also include one or more disk storage devices. Data storage device 100 further includes a data path 108 that communicates data from host device 101 to non-volatile storage 106 and from non-volatile storage 106 to the host. Data path 108 may include data buffers and error detection and correction modules for ensuring data integrity. In addition, as will be described in detail below, data path 108 may also include hint derivation and memory utilization optimization.

Figure 2:
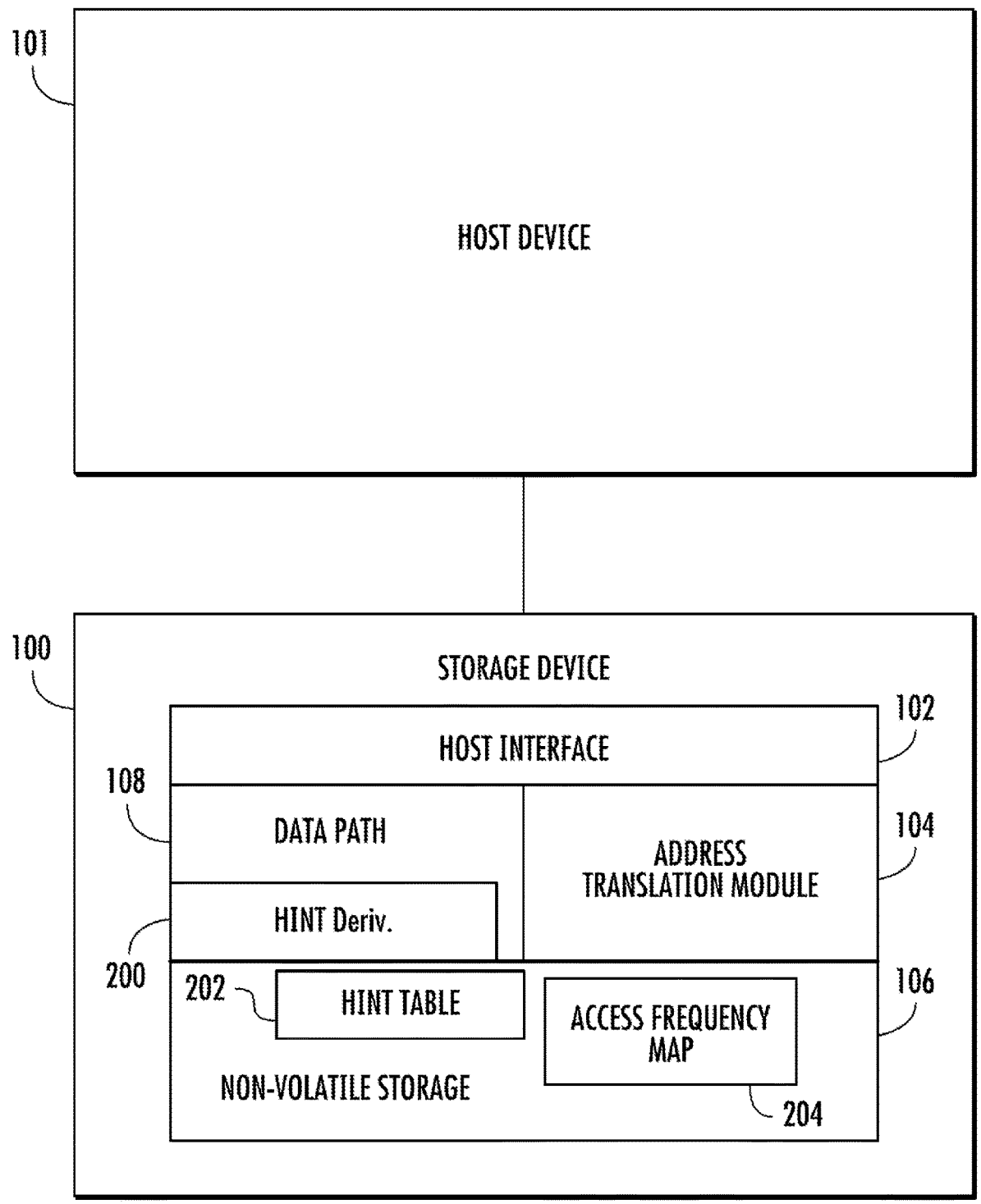
FIG. 2 is a block diagram of exemplary components of a data storage device with a hint derivation circuit, hint tables, and an access frequency map according to an embodiment of the subject matter described herein.

FIG. 2 is a block diagram of data storage device 100 and host device 101 in FIG. 1 where data storage device 100 includes a hint derivation circuit 200 for deriving hints from accesses to data storage device 100 and from file system metadata and utilizing the hints to optimize utilization of non-volatile storage 106. As used herein, a hint refers various characteristics of specific LBA ranges that may be of interest to the storage device. In FIG. 2, hint derivation circuit 200 may comprise a hardware or firmware component of data storage device 100 that resides on the data storage device side of host interface 102 and analyzes incoming data for patterns. Hint derivation circuit 200 may also detect the access frequency for LBAs in I/O requests from host device 101. Hint derivation circuit 200 may also derive hints from file system metadata. Hint derivation circuit 200 may use the hints to optimize utilization of non-volatile memory. Examples of optimizations that may be performed will be described below.

A hint table 202 stores LBA ranges and corresponding hints that indicate how the corresponding LBA range will likely be accessed by host system 101 in the future. In one example, the hints may be file types, which provide an indication of how the files will subsequently be accessed by the host system. Access frequency map 204 stores LBA ranges and frequencies of access for the ranges. Access frequency map 204 may be in the form of statistics, counters, logs, or any other direct or derived mechanism for recording access frequencies for different LBAs. Hint table 202 and access frequency map 204 may be stored in any suitable location within data storage device 100. For example, hint table 202 and access frequency map 204 may be stored in non-volatile storage 106 or in cache memory that is separate from non-volatile storage 106. In addition, hint table 202 and access frequency map 204 may be combined into a single data structure so that an access frequency is specified for each LBA range entry in hint table 202.

Exemplary Hint Derivation Processes

Figure 3:
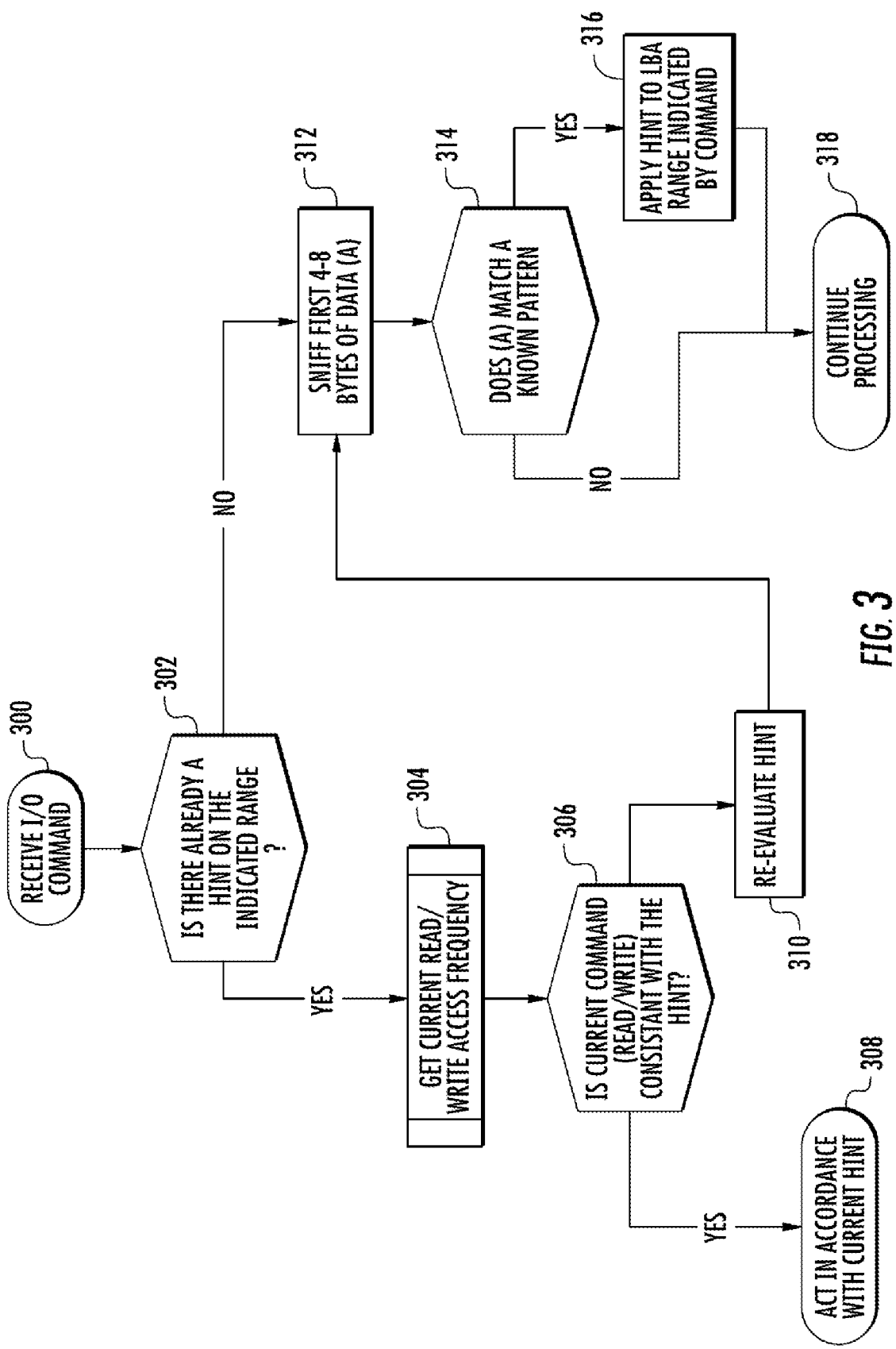
FIG. 3 is a flow chart illustrating an exemplary process for in-line hint derivation and memory utilization optimization according to an embodiment of the subject matter described herein.

FIG. 3 is a flow chart illustrating exemplary steps for in-line hint derivation and corresponding memory utilization optimization according to an embodiment of the subject matter described herein. By "in-line", it is meant that hints associated with the anticipated host memory access pattern are derived by the data storage device while performing a host initiated I/O operation. In-line hint derivation and corresponding memory optimization is believed to be beneficial because the anticipated type of memory access for a specific LBA range in an I/O request can be used to determine where to initially store data from the I/O request in the case of a write operation. However, the subject matter described herein is not limited to in-line hint derivation and memory utilization optimization. Hint derivation may be performed asynchronously with respect to I/O operations. Asynchronous hint derivation may not allow optimization of how data is initially stored. However, the data can be subsequently moved to optimize utilization of data storage device 100.

Referring to FIG. 3, in step 300, an I/O command is received. The I/O command may be a read command or a write command received by hint derivation circuit 200. In step 302, it is determined whether or not a hint already exists for the LBA range in the I/O command. In order to determine whether a hint exists for the range specified in the I/O command, hint derivation circuit 200 may extract the LBA range from the I/O command sequence and perform a lookup in hint table 202 to determine whether an entry for the LBA range is present in hint table 202. Table 1 shown below illustrates exemplary entries that may be present in hint table 202:

TABLE 1

Exemplary Hint Table Entries

| LBA Range | Hint |
|---|---|
| 0x00000000-0x3FFFFFFF | JPEG Image File |
| 0x40000000-0x400001F3 | Executable File |
| 0x50000000-0x8FFFFFFF | Swap File |

In Table 1, the left hand column includes LBA ranges corresponding to previous I/O operations by host device 101 for which hints have been derived. The right hand column includes corresponding hints. In the illustrated example, the hints are file types which provide insight as to how the data may be accessed by the host in the future. For example, the first entry in the hint table indicates that the LBA range stores a JPEG image file. A JPEG image file may be a photo that is likely to be written only once and then read sequentially. Such a file is preferably stored in static memory cells that have a relatively lower number of remaining program and erase cycles, as it is unlikely that even for read operations the JPEG image file will be frequently accessed. In addition, the JPEG image file may be distributed across flash memory in a manner that is optimal for sequential read access. It may also be desirable to store the JPEG image file with other JPEG image files that were created around the same time, as accesses to JPEG image files that relate to the same event are likely to occur together.

The second entry in Table 1 is an executable file. Similar to a JPEG image file, an executable file is likely to be written once and then read sequentially when the corresponding program is executed. An executable file may therefore be stored or distributed across memory cells in a manner that is optimal for sequential read access. The executable file may be stored in static or dynamic regions of non-volatile storage 106 depending on the type of program and anticipated frequency of access. For example, if the program is a web browser which is likely to be frequently accessed, the web browser may be stored in a dynamic portion of non-volatile storage 106. If however, the program is a back-up program that runs only once per week, the program may be stored in a static region of non-volatile storage 106.

The third entry in Table 1 includes a hint that indicates that the file is a system swap file. A swap file is typically frequently accessed because it enables an operating system to use secondary storage devices, such as data storage device 100, to simulate extra memory. When the system runs low on memory, it swaps a section of system Random Access Memory (RAM) that an idle program is using onto the data storage device to free up memory for other programs. A swap file is preferably stored in a dynamic region of non-volatile storage 106 in light of the frequent access and low latency requirement of a swap file. A dynamic region of non-volatile storage 106 may, in addition to having a large number of remaining program and erase cycles, be a region with relatively low access latency, as compared with other regions of non-volatile storage 106.

Returning to step 302 in FIG. 3, if a hint is present, control proceeds to step 304 where the current read or write access frequency is determined. This step may be performed by hint derivation circuit 200 accessing access frequency data stored for the LBA range in the I/O operation in access frequency map 204. In step 306, it is determined whether the current command is consistent with the hint. Determining whether the current command is consistent with the hint may include examining the command type and/or the access frequency data to determine whether the hint needs to be reevaluated. For example, if the hint stored for a particular LBA range indicates that the file stored is JPEG image file and the command is a write command, the hint may require reevaluation, as it is unlikely that a JPEG file will be overwritten by the host once it is written the first time. In the same example, if the command for the LBA range is a read command for a previously stored JPEG file, then the command is consistent with the current hint. If the current command is consistent with the hint, control proceeds to step 308, where an action is performed in accordance with the current hint. Performing an action in accordance with the current hint may include carrying out the I/O operation and updating the associated access frequency data. Continuing with the JPEG file example, the read command may be executed. If the current command is not consistent with the hint, control proceeds to step 310 where hint re-evaluation begins.

As part of hint re-evaluation, in step 312, the first four bytes of data in the command are analyzed. In step 314, it is determined whether the data matches a known pattern. Table 2 shown below illustrates different patterns that may be analyzed in a Macintosh (MAC) or Windows-based file system.

TABLE 2

Windows File System Patterns

| Pattern | Hint |
| --- | --- |
| "FILE" | NTFS MFT entry |
| "PK" | ZIP compressed file (including JAR files, Android APK files, and compressed document files) |
| "RCRD", "RSTR" | NTFS log metadata |
| 0xFE 0xED 0xFA | Mach-O executable |
| "HIBR" | Hibernate data |
| "MZ" | Windows or UEFI executable |
| 00 00 00 18 66 74 79 70 00 00 00 1C 66 74 79 70 | MPEG-4 video file |
| "ID3" | ID3v2-tagged MP3 file |
| "MDMP" | Windows minidump file |
| "PAGEDUMP" | Windows pagedump file |
| 0x89, "PNG" | PNG Image file format |
| 0x42 0x4D | BMP Image file format |
| "GIF" | GIF Image file format |

In the examples in Table 2, the patterns in the left-hand column correspond to file type in the right-hand column. The file types can be used by data storage device 100 to determine how that file will be accessed. For example, if the file is an executable file, it is known that executable files are relatively static. That is, they are typically written once to non-volatile storage, not modified, but may be completely erased and replaced. Thus, an executable file may be written to a static or portion of non-volatile storage. In another example, if the data contains the pattern "PK", or is determined to be an image file format, or is determined to be of particular audiovisual file formats, then the file may be determined to be a compressed file. A compressed file is not likely to require recompression and thus may be stored in static portion of non-volatile storage 106.

Continuing with step 314, it is determined whether the first 4 to 8 bytes of data in the data or payload portion of the I/O command sequence matches a known pattern. If the data matches a known pattern, control proceeds to step 316 where a hint is applied to the logical block address range indicated by the I/O command. Applying the hint may include storing the derived hint for the LBA range in the hint table and treating the data in accordance with the identified file type to optimize utilization of the memory data storage device. If the hint does not match a known pattern, control proceeds to step 318 where processing is continued. Continuing the processing may include completing the I/O command and updating the access frequency for the LBA range.

Figure 4:
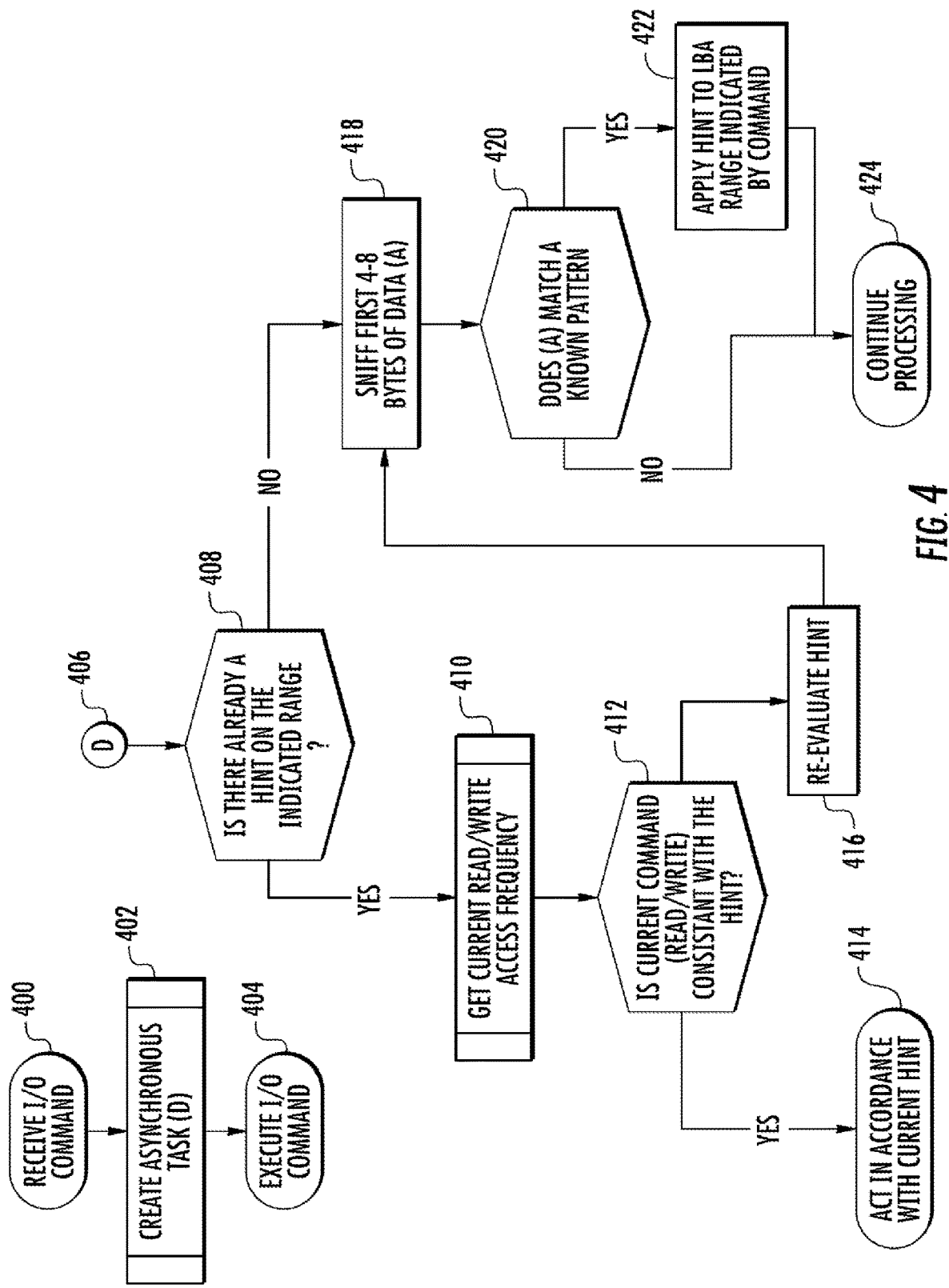
FIG. 4 is a flow chart illustrating an exemplary process for asynchronous hint derivation and memory utilization optimization according to an embodiment of the subject matter described herein.

As stated above, the subject matter described herein is not limited to deriving hints in-line, although such derivation is desirable because it allows any data storage device optimizations to be performed when data is initially stored in non-volatile storage 106. The subject matter described herein also includes deriving hints asynchronously, i.e., performing the I/O operations and deriving hints asynchronously from the I/O operations. Deriving hints asynchronously is likewise beneficial to ensure repeated optimization of storage resources. FIG. 4 is a flow chart illustrating asynchronous hint derivation according to an embodiment of the subject matter described herein. Referring to FIG. 4, in step 400, an I/O command is received. The I/O command may be a read command or a write command regarding a specific LBA range. In step 402, an asynchronous task "D" is created to derive the hint for the I/O command. Creating the asynchronous task may include spawning a thread or process that analyzes the data in the I/O command sequence and any previously stored hints. In step 404, the I/O command is executed independently of the process that derives and acts on the hint. Referring to step 406, asynchronous task D begins its execution. The asynchronous task D executes steps 408-424 to derive the hint and apply the hint. Steps 408-424 are the same as steps 304-318 described above with respect to FIG. 3, with the exception that applying the hint (step 414 or 426) occurs independently of the current I/O operation. For example, applying hints may include marking the LBA ranges in the hint table such that when NAND maintenance operations, read look ahead, or other logical operations optimizing the data are utilized, the hint is available and is used as a method of making decisions about the data. For example, if the hint indicates that the data is temporary, it may be skipped in relocation decisions. Alternatively, if the data is expected to be heavily read but not written often, it may be grouped together with other "hot read" data to reduce read scrub copies of data which is relatively static.

As stated above, hint derivation may also occur by parsing file system metadata. File system metadata refers to data that is written by the file system to non-volatile storage to characterize files. File system metadata may be parsed for hint derivation as it is written to data storage device 100, during data storage device idle time, or opportunistically during maintenance operations that access the physical blocks in which the metadata is stored. File system metadata typically includes the following information about each file (all attributes are present in the New Technology File System (NTFS) of Microsoft, the Hierarchical File System plus (HFS+) file system of Apple, and the fourth extended file system (ext4) of Linux): Access times (last access, last modification, creation time); Filename; Directory structure; and Extent map (map of file offsets to LBA ranges).

In some file systems (such as NTFS and HFS+), the extent map may include resident portions in a central file (called the catalog file in HFS+ and the master file table (MFT) in NTFS), as well as a non-resident extension used for additional extent maps in severely fragmented files. Depending on internal device resources, data storage device 100 may elect not to de-reference non-resident extents into hints.

Filename parsing works based on common usage patterns associated with file extensions or directory trees. For example, the Windows operating system uses the "Program Files" and "Program Files (x86)" directories to store executable resources, which are typically static. Furthermore, executables in Windows tend to have an extension of "EXE" or "DLL". Correspondingly, Mac OS X uses directories with the extension ".app" to store executables. (The actual executables in Mac OS X do not have an identifying extension.) Temporary files have a ".tmp" extension or are in a directory called "tmp" or "Temporary Internet Files". Internet browser cache files (which are also short-lived) may have identifying characteristics such as brackets in the filename, enclosing a single digit.

Figure 5:
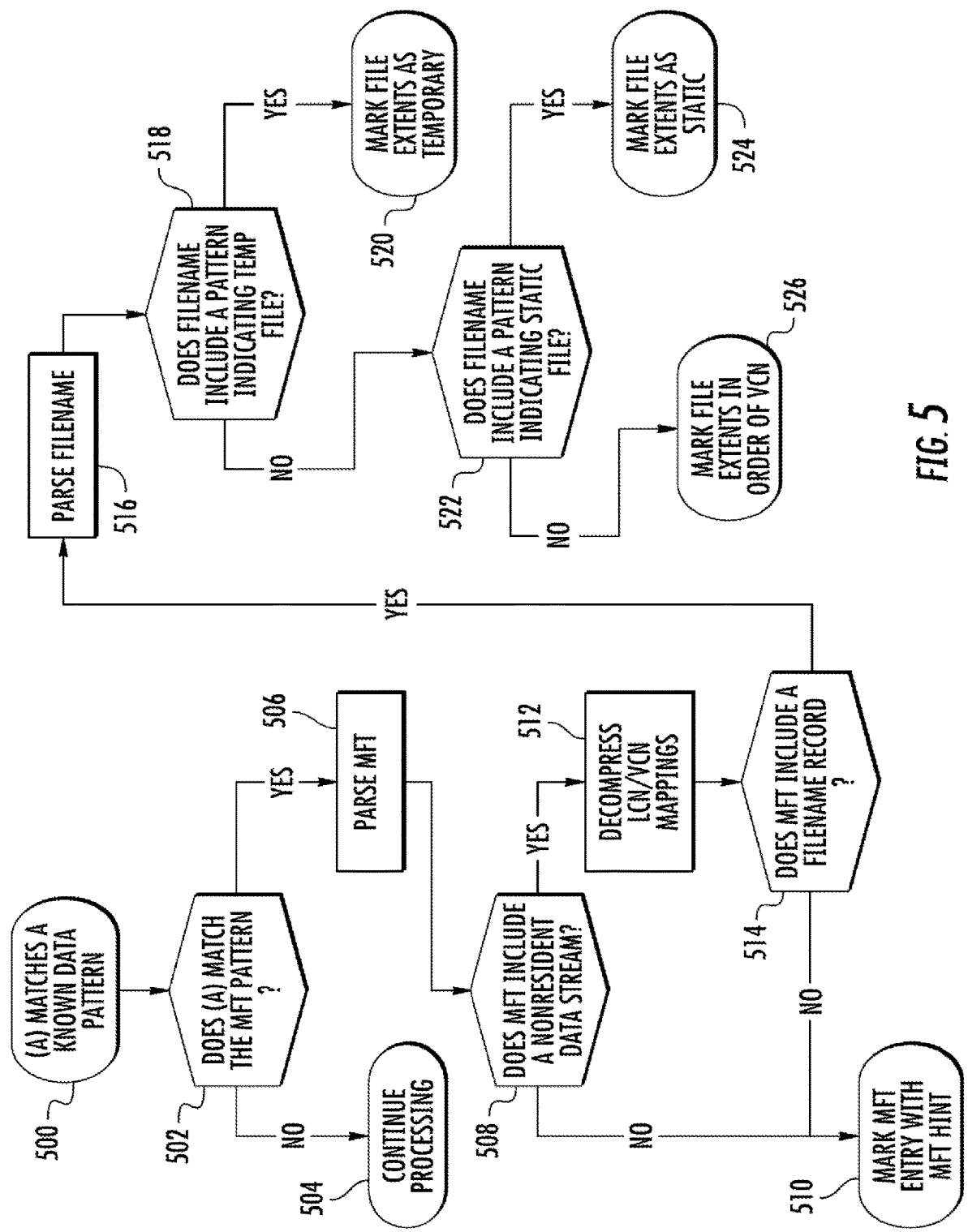
FIG. 5 is a flow chart illustrating an exemplary process for parsing file names in a master file table according to an embodiment of the subject matter described herein.

FIG. 5 illustrates hint derivation by file name parsing according to an embodiment of the subject matter described herein. In step 500, it is determined whether data in an I/O command sequence received by data storage device 100 matches a known data pattern. In step 502, it is determined whether the data matches the MFT pattern. As illustrated by the second entry in Table 2, the MFT pattern is the characters "FILE". Thus, if the data parsed from the I/O operation includes the characters "FILE", then the I/O operation may be determined to be a write to the MFT table. If the operation does not match the MFT pattern, control proceeds to step 504 where processing is continued. Continuing the processing may include performing another type of hint derivation, such as based on last written and last read attributes maintained by the file system as will be described in more detail below.

In step 502, if the data matches the MFT pattern, control proceeds to step 506, where the MFT is parsed. Parsing the MFT includes locating the MFT entry corresponding to the I/O operation. Parsing the MFT continues in step 508, where it is determined whether the MFT entry stores a non-resident data stream. A non-resident data stream is a file whose location is specified in the MFT entry, but which is stored external to the MFT. A resident data stream is a file that is stored in the MFT entry. Accordingly, a write to the MFT for a resident file is a write to the file. Thus, if the MFT entry has a resident file, control proceeds to step 510 where the MFT entry is marked with a hint indicating that the entry includes an MFT resident file.

Returning to step 508, if the MFT entry includes a non-resident data stream, i.e., a pointer to one or more locations outside of the MFT that stores the corresponding file, control proceeds to step 512 where the logical cluster number/virtual cluster number (LCN/VCN) mappings that indicate storage locations for a non-resident file are decompressed. In step 514, it is determined whether the MFT entry includes a file name record. If the MFT entry does not include a file name record, control returns to step 510 where the entry is marked with an MFT hint. An MFT hint may explicitly identify the entry as an MFT entry.

If the MFT entry includes a file name record, control proceeds to step 516 where the file name is parsed. File name parsing continues in step 518 where it is determined whether the file name includes a pattern indicating a temp file. File names for temp files vary per operating system. In a Windows-based operating system, a temp file may end with the suffix ".tmp" or may include closed brackets that surround a single number. If the file name pattern indicates a temp file, control proceeds to step 520 where the file extents that store the file are marked as temporary. Marking the extents as temporary may include inserting hints in the MFT table that marks the extents as temporary or adding entries to the hint table that mark the LBA ranges corresponding to the file extents or containing a temp file.

Returning to step 518, if the file name does not include a pattern identifying the file as temporary, control proceeds to step 522 where it is determined whether the file name includes a pattern identifying a static file. As described above, examples of static files are executable files and sometimes image files. If the file name includes a pattern identifying the file as static, control proceeds to step 524 where the extents are marked as static. If the file name does not include a pattern indicating a static file, control proceeds to step 526 where the extents are marked in the order specified by the virtual cluster numbers in the MFT table. The purpose of ordering the extents allows the data storage device to know the order of data in the file so that the device can reorder aspects of the file (e.g., file sub-components or metadata) for optimal host access. For example, reordering aspects of the file may include storing the extents of the file in different memory blocks so that they can be read out in parallel.

As stated above, another approach to parsing file system metadata is to parse last written and last read attributes in the file system and to combine these attributes with correctable error count rates or with internal counters in order to determine the access frequency of the read and optimize read scrub algorithms. Correctable error rates would correlate with increased read activity in some storage types and may be augmented by device based historical data collected on reads and writes to extents that map to files that are expected to be heavily accessed.

Figure 6:
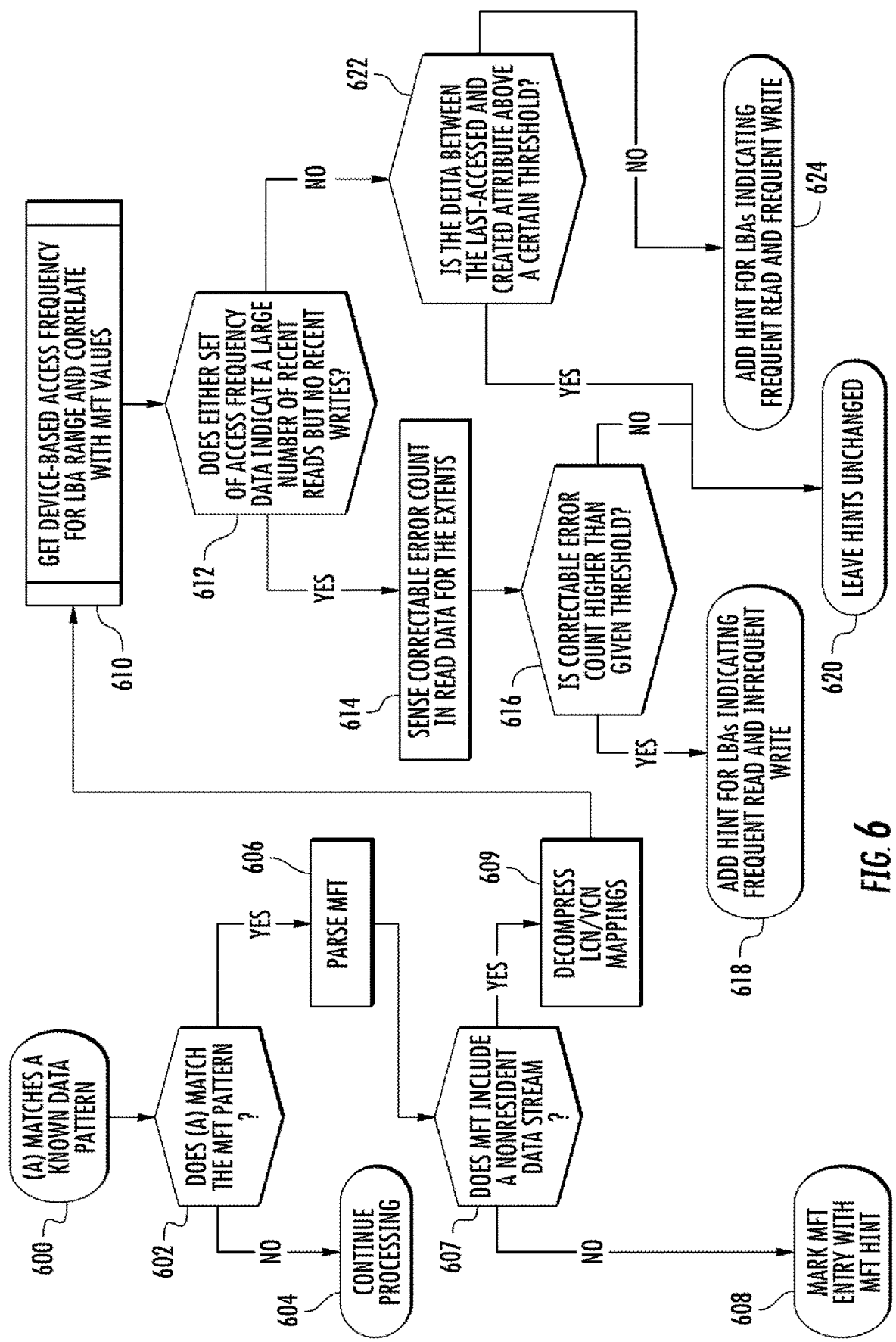
FIG. 6 is a flow chart illustrating an exemplary process for deriving hints from frequently read and frequently accessed attributes in a master file table according to an embodiment of the subject matter described herein.

A frequently read or frequently written hint can be based on combinations of these two inputs, as described below with respect to FIG. 6. Referring to FIG. 6, in step 600 and 602, it is determined whether the file and the data in an I/O request match the MFT pattern. As described above, the MFT pattern in a Windows file system is the word "FILE". If the file name does not match the MFT pattern, control proceeds to step 604 where additional processing is performed to determine whether the data matches any of the other patterns described above.

If the data in the I/O request matches the MFT pattern, control proceeds to step 606 where the MFT is parsed. Parsing the MFT may include locating the MFT entry corresponding to the I/O operation. In step 607, it is determined whether the MFT entry includes a non-resident data stream. If the MFT entry includes a resident data stream, control proceeds to step 608 where the entry is marked with a hint indicating that the LBA range in the I/O request corresponds to an MFT resident file. If the MFT entry includes a non-resident data stream, control proceeds to step 609 where the LCN/VCN mappings are decompressed to determine the locations of the extents that store the non-resident file. Once the LCN/VCN mappings are determined, control proceeds to step 610 where the device based access frequency for the LBA range is obtained from the access frequency map and that access frequency is correlated with the MFT attributes that correspond to file access frequency. In step 612, it is determined whether either set of access frequency data indicates the large number of reads but no recent writes. If the access frequency data indicates a large number of reads but no recent writes, control proceeds to step 614 where a correctable error count is sensed in read data for the extents. In step 616, it is determined whether the correctable error count is higher than a given threshold. If the correctable error count is higher than a given threshold, control proceeds to step 618 where a hint is created for the LBAs indicating frequently read and infrequently written. If the correctable error count is not higher than a given threshold, control proceeds to step 620 where the hints associated with the LBA range are left unchanged.

Returning to step 612, if it is determined that either set of access frequency data does not indicate a large number of reads but no recent writes, control proceeds to step 622 where it is determined whether the difference between the last accessed and created attribute is above a threshold. If the last accessed and created attribute is above the threshold, this means that the file is static, and control proceeds to step 618 where the hints are left unchanged. If the difference between last accessed and created attribute is not above the threshold, this means that the file is frequently read and written, so control proceeds to step 624 where a hint is added to the logical block addresses indicating frequently read and frequently written data. As described above, hints that indicate frequently read and frequently written data can be used to place the data in a region of the data storage device that contains memory cells with a larger comparative number of remaining program and erase cycles.

Although in the examples illustrated in FIGS. 5 and 6 file system metadata is parsed in the context of an I/O request, the subject matter described herein is not limited to deriving hints from file system metadata in the context of an I/O request. File system metadata constitutes data that is stored in non-volatile memory. Accordingly, such metadata can be parsed independently of I/O operations to derive hints associated with LBA ranges corresponding to files referenced in file system metadata.

In addition, the subject matter described herein is not limited to parsing timestamps and filenames to derive hints. Another type of file system metadata that may be used for hint derivation are file attributes (read only, hidden, system, compressed) that can also be extracted to help with hinting. For example, if a file is marked read only, then it is not likely that the file will be modified and the file can be stored in a static portion of non-volatile memory 106. Similarly, if a file is marked as hidden or system, this typically refers to the file is being a part of the operating system. A file that is part of the operating system is one that is not likely to be modified, so it could also be stored in a static portion of non-volatile memory 106. The file attributes can be combined with any of the attributes or other sources described herein for enhanced hint derivation.

The subject matter described herein includes a file system aware scheme that is implemented in a data storage device for regulating data writes and other data transfer operations based on knowledge of the layout of the host operating file system to achieve better write performance. The subject matter described herein can be used to support any major file systems that are currently in use or that may be used it the future, for example, in the mobile or non-mobile world, including ext2, ext3, ext4, and others.

The subject matter described herein includes a file system aware scheme in the non-volatile data storage device that is designed to regulate writes coming in from the host by implementing a filtering mechanism that distinguishes between file system data (metadata) and between file content and other data. The filtering mechanism is designed to separate access requests for metadata and access requests for other data (such as file content) and filter out the required file system metadata information based on the knowledge of the layout of the file system.

One possible mechanism for implementing the filtering described herein can be based on the knowledge that file systems commonly store superblocks at fixed locations that do not change after file system creation. The superblock records various information about the enclosing file system, such as block counts, inode counts, supported features, maintenance information, and other information. The superblock also contains information about locations of file system metadata in memory. One example of file system metadata that may be located in a superblock is the location of the file system journal log, which contains a log of host write operations that have yet to be performed to the file system.

According to an aspect of the subject matter described herein, the device controller, i.e., the controller of the non-volatile data storage device, may analyze the file system metadata to determine to which memory blocks the file system will write host data before the data is actually written to the data storage device. This information may be filtered or provided to the device controller for use by the controller in regulating host writes in a more efficient manner. Such information provides the device controller with an indication of to which memory blocks the file system will write the data before the data is actually written to the data storage device.

Thus, a device controller of the subject matter described herein may be file system aware in that the controller is capable of organizing data into file system metadata and other content, where the other content includes file data and other data. The other data typically contains the contents of files or user data. Compared to metadata, most user data is less frequently accessed, and each access to user data typically touches data of a larger size. File system metadata typically contains information about the file system, file attributes, and file directories. The file system metadata includes indexes to locations of memory blocks that are scheduled to be written by the file system into the device memory. The indexes are referred to as inodes and are stored in the journal log. The journal log is typically stored in a dedicated area on the non-volatile data storage device and contains the indexes to memory blocks containing data file changes and updates that the file system will make in the future. These indexes can be translated into logical block addresses of memory blocks where the host data corresponding to the inodes will be written.

In some file systems, such as ext3 and ext4, there are two possible mechanisms for converting between inodes and logical block addresses. The first mode is a direct-indirect block addressing approach, and the second mode utilizes an extent tree implementation. In the first mode, file block numbers (inode numbers) are mapped to logical block numbers (logical block addresses) by navigating a three level block map. To find a logical block that stores a particular file block, the block map is navigated using the file block number as an index to locate the corresponding logical block number.

In the second mode, file system extents are arranged as a tree. Each node of the tree begins with a structure extent_header. If the node is an interior node, the header is followed by instances of the structure ext4_extent_idx. Each of these index entries points to a block containing one or more nodes in the extent tree. If the node is a leaf node, then the header is followed by extent header entries instances of the structure extent. These instances point to the file system's data blocks. The root node of the extent tree is stored in such a manner that allows for the first four extents to be recorded without the use of extra metadata blocks. Thus, using the second mode where file system extents are arranged as a tree, mapping an inode number to a logical block address may include traversing the extent tree using the inode number as an index until a leaf node is located. The leaf node stores the block number to which a particular file system extent points.

In general, journaling is a file system aware feature in which all data file updates and changes that the file system will make are recorded ahead of time in a journal log and maintained in a dedicated area of the file system before committing the updates to the main file system. The journal log provides an audit trail of the file system associated with memory allocation blocks and host data writes that are defined by the file system. Such information is typically used to reconstruct file system if the original file is damaged or destroyed, so that in the event of a system crash or power failure, such file systems are quicker to bring online and less likely to become corrupted. However, according to an aspect of the subject matter described herein, the proposed file system aware scheme operates to utilize the information in the journal log for efficient data write purposes. In addition, the subject matter described herein utilizes the information in the journal for more efficient handling of internal housekeeping operations within the data storage device.

The journal log is typically designed as a table array containing descriptor blocks (DB0, DB1, etc.), which store the transaction ID number, inode information from which LBA addresses have yet to be written blocks by the file system can be calculated, and corresponding commit blocks (CB0, CB1, etc.), indicative of an end of a data write operation.

For example, in the case where the specified data in an incoming host write command is associated with a transaction ID number (e.g., 100) for DB1, then the LBA addresses of the yet to be written memory blocks in the device memory may be calculated from the corresponding inode information within the journal log. The following simplified example illustrates information that may be contained within the journal log:

$DB0$ inodes $CB0$ $DB1$   $CB1$ $DB2$   $CB2$

...

In the above-listed example, the inodes between DB0 and CB0 can be used to calculate the LBA addresses of memory blocks that are yet to be written to the device.

The following steps illustrate a possible flow for the subject matter described herein:

1. Upon receiving a host write access request of data, differentiate between metadata (file system data) access request and (other data) request.
2. Identify the location of the journal log within the access request for file system metadata by accessing the descriptor block and corresponding inodes information associated with the incoming host write access request. In the ext4 file system, access to journal log is mostly performed with a special inode number which is equal to 8. In any case, file system journal location information can be parsed from superblock information as well. The device controller will check the properties of all data written to this inode. The logical block address (LBA) of this inode is calculated from superblock information.
3. Obtain indexes (inodes) information associated with the descriptor block specified in the incoming host write access request.
4. For the incoming host write access request, calculate the LBA addresses of memory blocks that are yet to be written by the file system in the device memory from their associated indexes (inodes) information in the journal log. The LBA addresses of memory blocks associated with data writes that are yet to be written by the file system are then filtered to the device controller for use by the controller. Such information provides the device controller an indication as to where (i.e. which memory blocks) the file system will write the host data before the data is actually written in the data storage device.
5. Then, prepare the device memory array for regulating upcoming host writes according to the identified LBA addresses of yet to be written blocks in the device for efficient data writes purposes. Knowing where (which memory blocks) the file system will write upcoming host data allows the device controller to prepare for upcoming host write operations in various ways, as required. As a result, host write operations are managed by the device controller in the data storage device in a more effective way based also on information that is maintained in the journal log within the metadata (file system data), wherein such information is indicative of the memory locations of memory blocks that are yet to be written by the file system.

As stated above, after parsing the file system metadata, the device controller may prepare the data storage device for the future write operations identified from the file system metadata. Exemplary preparations that may be performed are as follows:

Making identified LBA addresses of yet to be written memory blocks available, for example, in a continuous manner for upcoming sequential host writes;

Preparing the device for handling burst control operations accordingly, for example, by allocating an available (e.g., continuous) storage partition and device memory;

Handling scheduling of other internal housekeeping operations accordingly, for example, activating or deactivating garbage collection operations (i.e., reclaiming memory locations that are no longer in use) on the identified memory blocks only according to specific configuration, and so on;

Mapping logical memory addresses to physical memory addresses for memory blocks to be written to the device so that the memory blocks will reside on the same memory die, identifying desired memory dies for performing host writes, determining which memory die to perform the host writes so as not to leave undesired holes in the memory array, etc.

According to another aspect of the subject matter described herein, in the case of a file system configuration where the file system of the host is configured not to write host data between a descriptor block and a commit block, the subject matter described herein can be further applicable to utilize the detection of a commit block for more efficient handling of internal housekeeping operations, such as garbage collection and other internal memory management operations within the data storage device. For example, currently, garbage collection will be triggered after a large amount of idle time. The receipt of a commit block may be used as a trigger to reduce the wait time for garbage collection.

One advantage of the subject matter described herein includes significantly improved write performance. Another advantage is that the subject matter described herein provides for efficient handling of incoming host writes based on LBA ranges of data blocks that are defined by the file system for host writes before the writes are actually written to the device memory. The subject matter described herein further provides for efficient handling of internal housekeeping operations based on file system information of yet to be written blocks to the device. The subject matter described herein may assist major file systems currently or that will be in use in mobile and other devices, including ext2, ext3, and ext4.

As stated above, according to an aspect of the subject matter described herein, file system metadata in host write requests may be parsed to identify regarding future host write operations and to determine when to perform housekeeping operations.

Exemplary Data Storage Devices for Parsing Metadata

Figure 7:
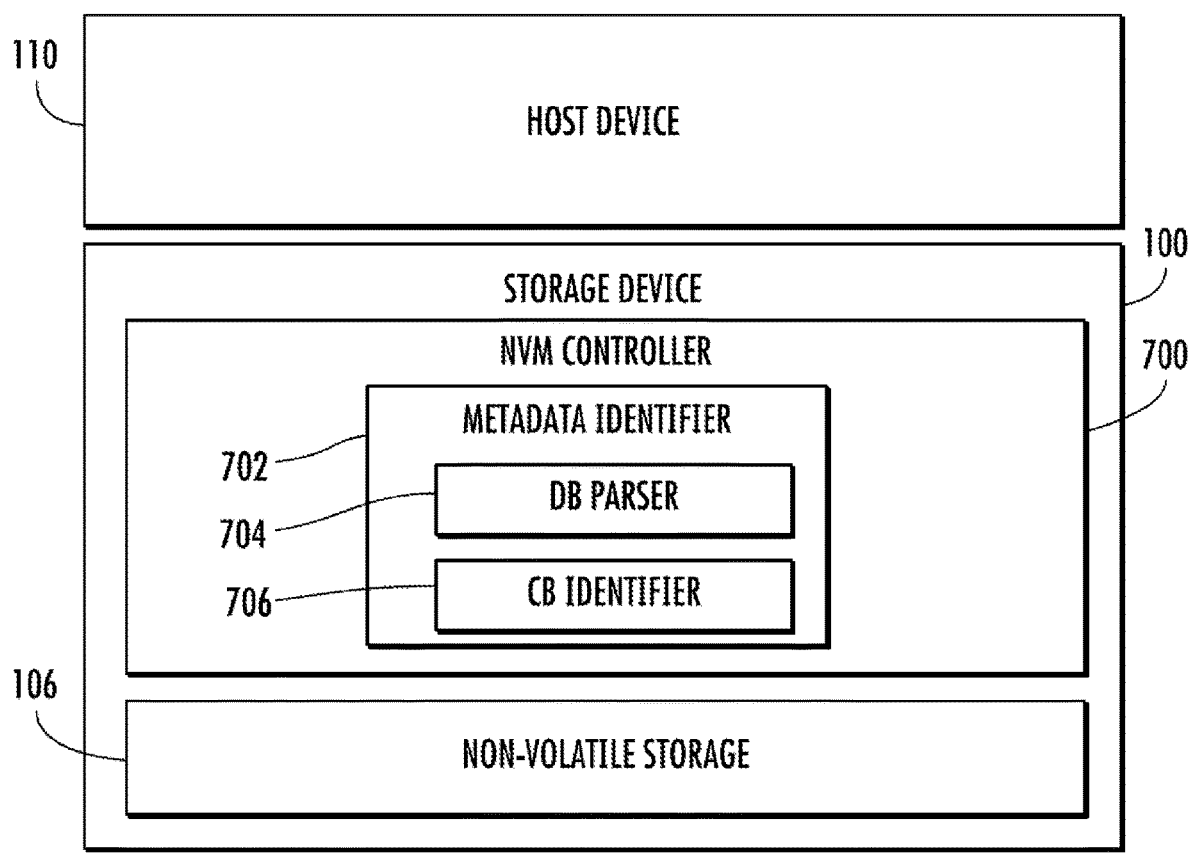
FIG. 7 is a block diagram illustrating a host device and a data storage device capable of parsing file system metadata in host write requests and preparing non-volatile memory for future write operations according to an embodiment of the subject matter described herein.

FIG. 7 is a block diagram illustrating a host device and a data storage device where the data storage device parses file system metadata in host write requests to prepare the data storage device for future host write operations and to determine when to perform housekeeping operations on the non-volatile data storage device. Referring to FIG. 7, data storage device 100, non-volatile memory 106, and host device 110 are described above with respect to FIG. 1. In FIG. 7, data storage device 100 includes a device controller 700 that controls access to non-volatile memory 106. Device controller 700 is typically a hardware or firmware component that resides on data storage device 100 to interface with host device 110 and control access to non-volatile memory 106. In the illustrated example, device controller 700 includes a metadata identifier 702 which is further divided into a descriptor block (DB) parser 704 and a commit block (CB) identifier 706. Metadata identifier 702 parses host write requests to identify the presence of file system metadata. DB parser 704 locates descriptor blocks in write requests determined to have file system metadata and parses the file system metadata following each descriptor block to determine information regarding future host write operations.

Commit block identifier 706 parses write requests determined to have file system metadata for the presence of a commit block. A commit block signifies the end of a write request. When a commit block is detected, controller 700 may perform housekeeping operations on non-volatile memory 106. An example of a housekeeping operation is garbage collection or other memory management operations.

Controller 700, based on the file system metadata parsed in the write request, prepares non-volatile memory 106 for future write operations.

Exemplary Processes for Parsing Metadata

Figure 8:
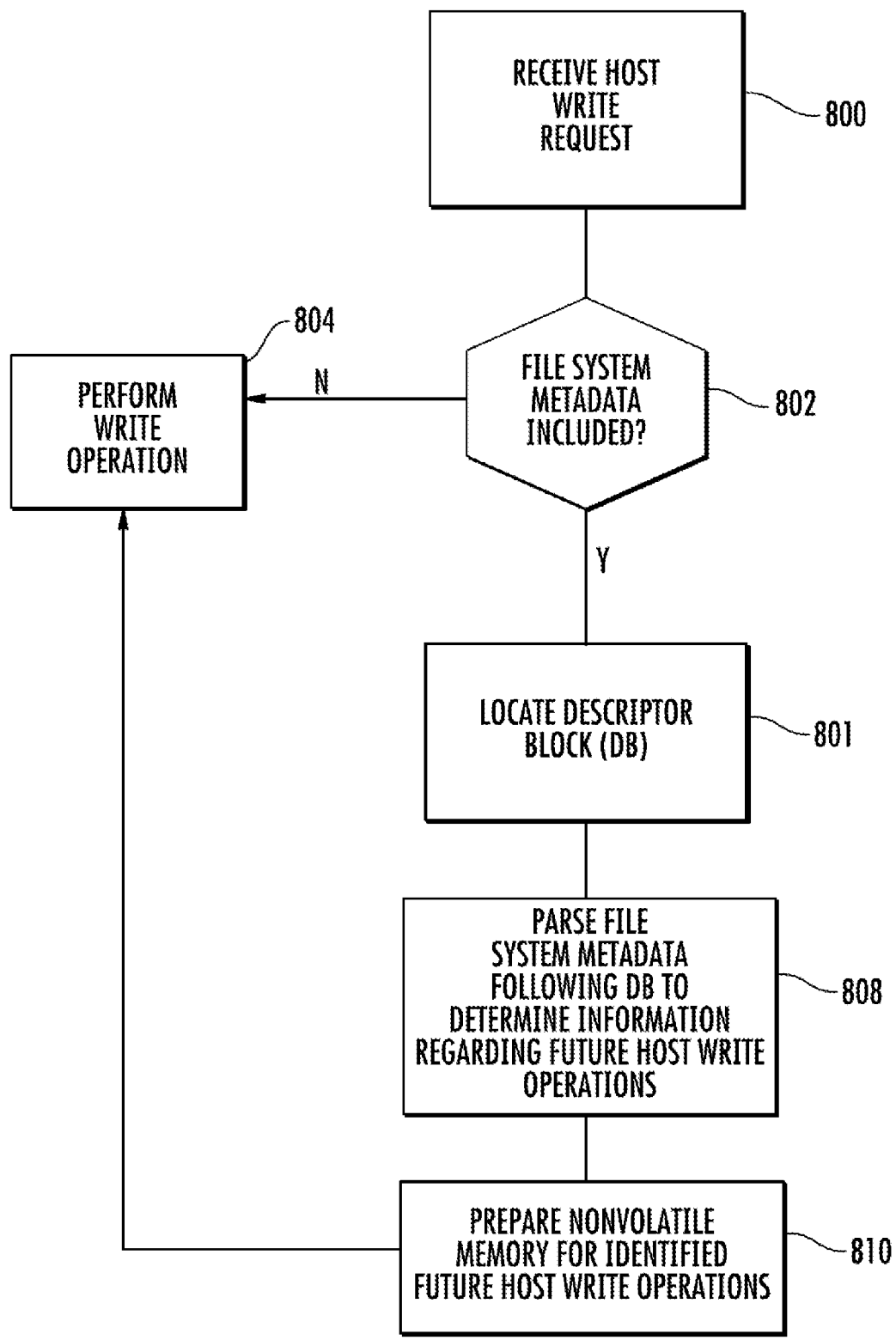
FIG. 8 is a flow chart illustrating an exemplary process implemented by a data storage device for parsing file system metadata and for preparing the data storage device for future host write operations indicated by the file system metadata according to an embodiment of the subject matter described herein.

FIG. 8 illustrates an exemplary process for identifying file system metadata in an incoming write request, parsing the file system metadata, and preparing non-volatile memory 106 for future host write operations based on information determined from file system metadata. Referring to FIG. 8, in step 800, data storage device 100 receives a write request. The write request may be passed to device controller 700. In step 802, it is determined whether the write request includes file system metadata. The presence of file system metadata in a write request may be determined based on logical block address (LBA) ranges in a write request that correspond to the memory location where the file system stores a file system journal. Writes to a file system journal include file system metadata because the file system journal is used by the file system to record information about upcoming write operations, such as which inodes or logical block addresses will be written in the future write operations. The purpose of the file system journal is to keep track of file system write that will occur so that the write operations can be replayed using the journal in the event of a system crash. If it is determined that the write request does not include file system metadata, control proceeds to step 804 where controller 700 performs the write operation specified in the write request.

If it is determined that the write request includes file system metadata, control proceeds to step 806 where a descriptor block (DB) is located in the file system metadata. DB parser 704 may locate the descriptor block by looking for predetermined bits that specify a descriptor block. The information following a descriptor block but prior to receiving a commit block contain file system metadata. Accordingly, in step 808, file system metadata following the descriptor block is parsed to identify information regarding future host write operations. Examples of information that may be determined from file system metadata is whether future write operations will be sequential, random, etc. In step 810, the non-volatile memory is prepared for the identified future host write operations. For example, controller 700 may enable burst mode for expected sequential write access patterns, perform urgent housekeeping tasks in preparation for new incoming data, delay copying from single level cells (SLC) to multi-level cells (MLC) when it is determined that the data to be copied will be overwritten by the received user data. After step 810, control proceeds to step 804 where the write operation specified by the write request is performed.

Figure 9:
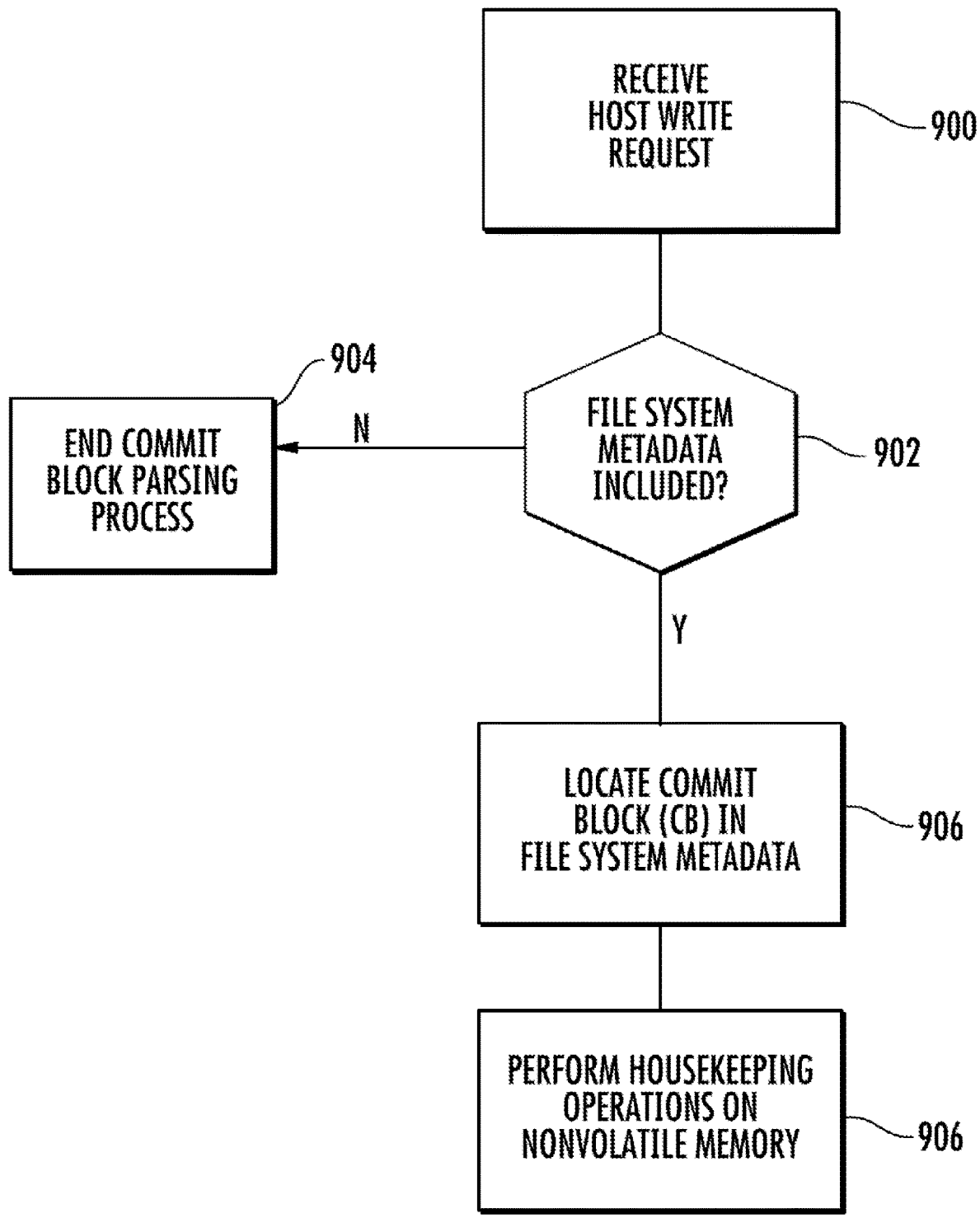
FIG. 9 is a flow chart illustrating an exemplary process implemented by a data storage device for parsing file system metadata and determining an optimal time for performing non-volatile storage housekeeping operations according to an embodiment of the subject matter described herein.

According to another aspect of the subject matter described herein, commit blocks in file system metadata may be used to signify a time for performing housekeeping operations on non-volatile memory 106. A commit block signifies the end of a write request and no data will be written to the non-volatile data storage device until another descriptor block is received. Accordingly, when a commit block is received, it may be desirable to initiate housekeeping operations, such as garbage collection or other memory management operations. FIG. 9 is a flow chart illustrating an exemplary process for determining when to perform housekeeping operations using file system metadata according to an embodiment of the subject matter described herein.

Referring to FIG. 9, in step 900, a write request is received from a host. The write request may be received by controller 700. In step 902, it is determined whether the write request includes file system metadata. If the write request does not include file system metadata, control proceeds to step 904 where the commit block parsing process ends. If the write request includes file system metadata, control proceeds to step 906 where a commit block is located in the file system metadata. The commit block may be identified by parser 704 illustrated in FIG. 7 using predetermined bits that specify a commit block. In step 908, in response to locating the commit block, controller 700 performs housekeeping operations on the non-volatile memory. Examples of housekeeping operations that may be performed include garbage collection and other memory management operations.

As explained earlier, file system metadata refers to data that is written by the file system to the non-volatile memory to characterize files and may include information about each file including access times, filenames, directory structure, and the extent map. Of further note, in some file systems such as NTFS and HFS+, the extent map may include resident portions in a central file (called the catalog file in HFS+ and the MFT in NTFS), as well as a non-resident extension (or additional extent maps in severely fragmented files).

Of further note, each cluster in a volume is given a sequential number, which is its Logical Cluster Number (LCN). For example, LCN 0 (zero) refers to the first cluster in a volume (i.e., the boot sector). In order to convert from an LCN to a physical offset in the volume, the LCN is multiplied by the cluster size. Additionally, each cluster of a non-resident stream is given a sequential number, which is its Virtual Cluster Number. Correlative to LCN, VCN 0 (zero) refers to the first cluster of the stream. In order to locate the stream on a disk, however, it is necessary to convert from a VCN to an LCN. This conversion may be accomplished with the help of data runs.

Optimizing FTL Operations

According to an aspect, the present disclosure further provides for apparatus and methods that optimize operation of an NVM memory device by prioritizing FTL operations or workflow based on region writes derived from file system metadata. In particular, the present methods and apparatus are configured to parse the file system metadata in order to obtain or generate a list of LBAs or LBA clusters that belong to each file extent, where an extent is a contiguous area of storage reserved for a file in a file system and may be represented as a run or range of LBAs, in one example. In other aspects, the file system metadata may be parsed for hint derivation as it is being written to the data storage device during a data storage device idle time or opportunistically during maintenance operations that access the physical blocks in which the metadata is stored.

Figure 10:
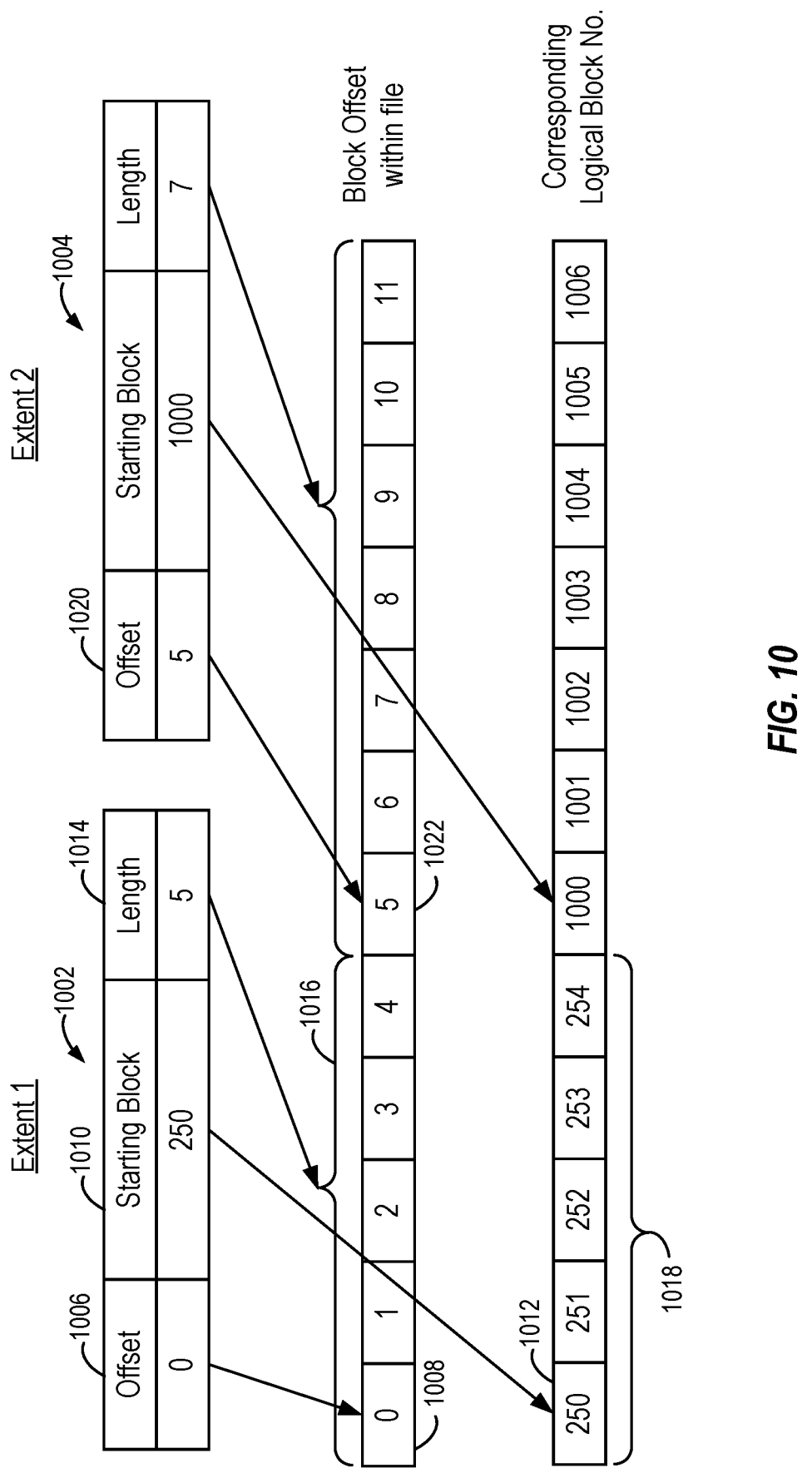

Before discussing the present methods and apparatus for optimization, as a visual exemplification of the concept of extents, FIG. 10 shows an example showing two extents—extent 1 1002 and extent 2 1004. Concerning extent 1 1002, the extent includes an offset value 1006 that references a block offset 1008 in a block offset within a file. Additionally, the extent 1 1002 will include a starting block number 1010, which is the logical block number or address at which the extent starts. In the example of FIG. 10, the starting block number 1010 of extent 1 1002 is 250 as shown at the corresponding block number as indicated at reference number 1012. Further, extent 1 1002 includes a length or range 1014. In the illustrated example, the length is five (5), which is shown corresponding to length or range 1016 of five consecutive block offset numbers. Additionally, the range 1016 corresponds to a range of five consecutive logical block numbers or address 1018. FIG. 10 further illustrates that for extent 2 1004, the offset number is 5 in the offset field 1020, which corresponds to offset 5 1022 in the block offset within the file.

Exemplary Systems for Optimizing FTL Operations

Figure 11:
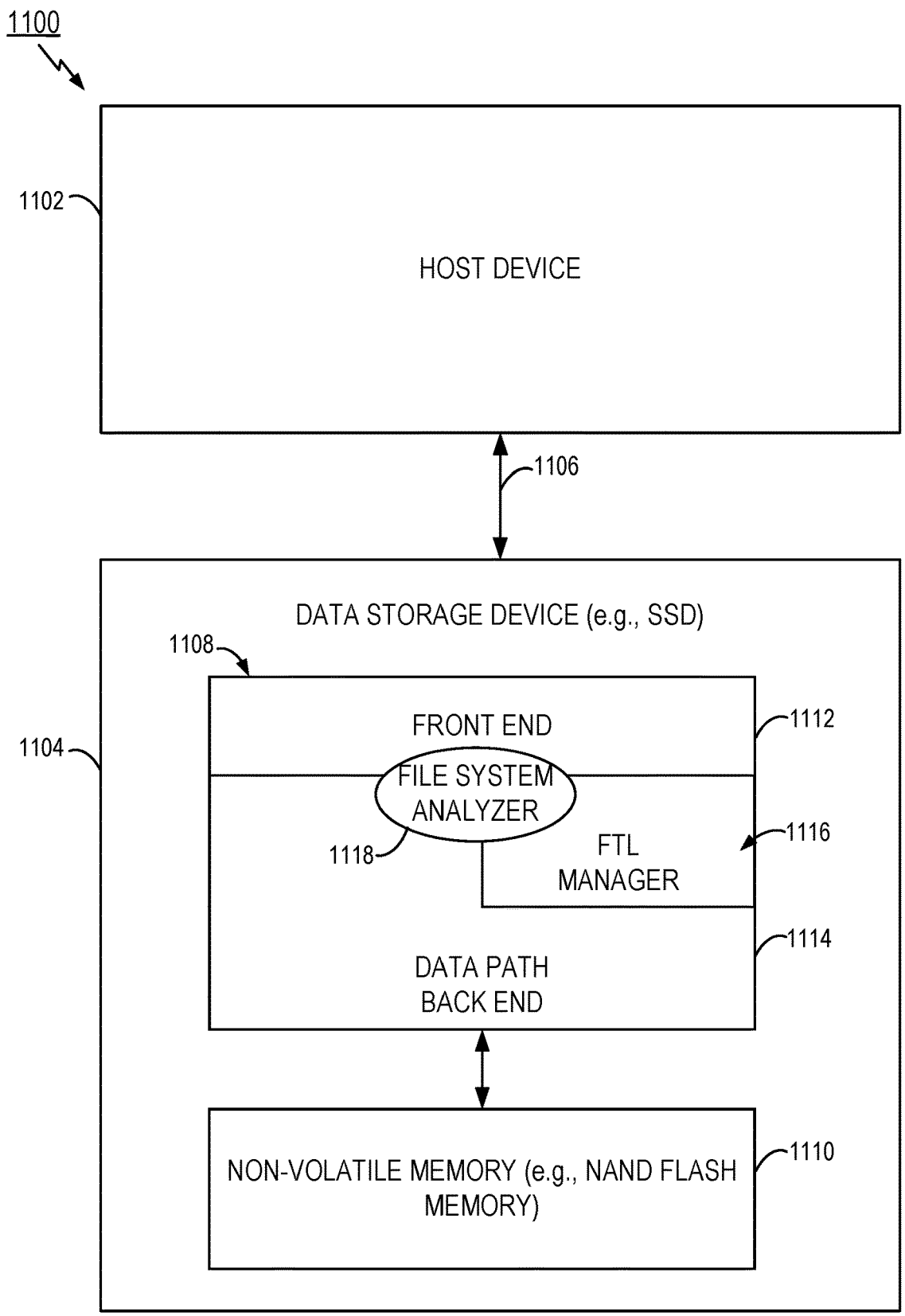
FIG. 11 is a block diagram illustrating another exemplary operating environment according to aspects of the subject matter described herein.

The block diagram in FIG. 11 shows an exemplary system in which the methods for optimization based on prioritizing FTL operations may be implemented. As illustrated, system 1100 includes a host device 1102 coupled with a data storage device 1104, such as an SSD, via an interface 1106. Within the data storage device 1104, the device is organized to include a memory device controller 1108 and a nonvolatile memory 1110 providing non-volatile memory storage for the host device 1102. In an aspect, non-volatile memory 1110 may be a NAND flash device, although other non-volatile data storage devices may also be used within the scope of the subject matter described herein. For example, non-volatile memory 1110 may be a NOR flash device, a memory incorporating NOR and NAND flash memory, or a device that combines solid state storage with disk storage.

The memory device controller 1108 may include hardware, software, and firmware components that control access by host device 1102 to the non-volatile memory 1110. Furthermore, the controller 1108 may be functionally organized to include a front end processing portion 1112 and a back end processing portion 1114 of the data path, where the front end portion 1112 interfaces with host 1102 including buffering write and read requests to control command and data flow between the host 1102 and the back end processing portion 1114. The back end processing portion 1114 may include a flash translation layer (FTL) manager or similar circuitry 1116, which may also utilize a dynamic memory (not shown) such as RAM to store a logical to physical (L2P) translation table or a portion thereof, among other things, and implements the data path that communicates data between the front end processing portion 1112 and the memory device 1110. In other aspects, the back end processing portion 1114 may include data buffers and error detection and correction modules for ensuring data integrity. As used herein, the FTL manager 1116 refers to software, hardware, firmware, circuitry, logic, or combinations thereof, and which may be realized or implemented by the memory device controller 1108.

In a further aspect, the controller 1108 may further include a file system analyzer 1118. This analyzer 1118, which may be implemented in firmware, hardware, software, or combinations thereof, is functionally implemented across the front end portion 1112 and the back end portion 1114 (i.e., the data path), and the FTL 1116 as illustrated by the overlap of analyzer 1118 across all of these functional blocks. In operation, the analyzer 1118 implements analysis or parsing of metadata for, among other things, determining information concerning a particular file system, such as file extents or extent maps. It is noted that, according to certain aspects, the file system analyzer 1118 may be static (i.e., reading from NAND representations of the file system) or dynamic (i.e., analyzing file system updates in the data path).

Exemplary Methods for Optimizing FTL Operations

Figure 12:
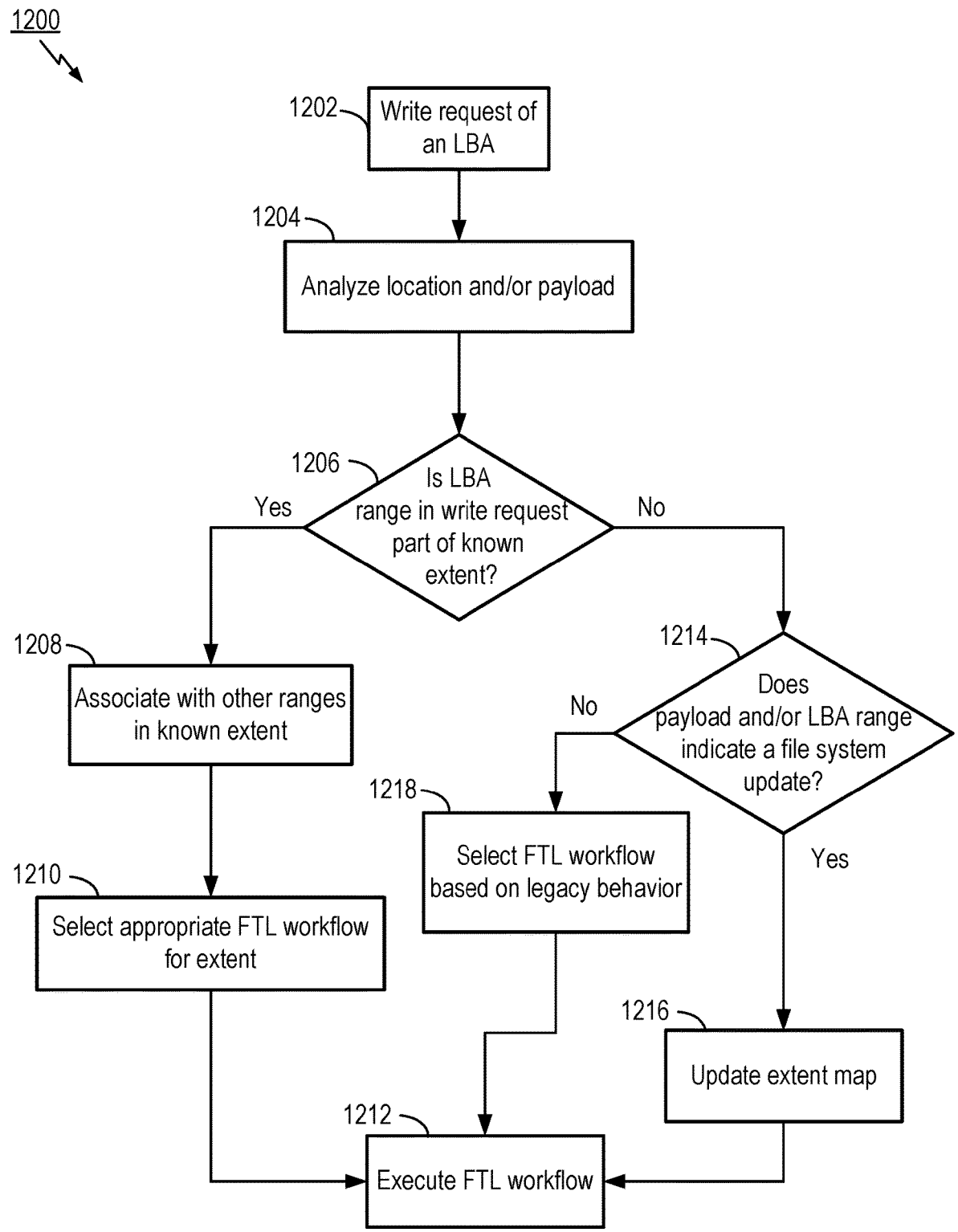
FIG. 12 is a flow chart illustrating an exemplary process for determining FTL workflows according to an embodiment of the subject matter described herein.

FIG. 12 illustrates an exemplary method 1200 for operation of a memory device according to aspects of the present disclosure. In an aspect, method 1200 may be implemented by the file system analyzer 1110 in FIG. 11, or equivalents thereof. As illustrated in FIG. 12, method 1200 includes receiving a write command from a host device in a memory device for an LBA as shown at block 1202. Data within the write request may be dynamically analyzed or parsed in the data path to determine at least one of the location and the payload for the write request as illustrated at block 1204. In an aspect, the LBA range determination in block 1204 is based on file system data extracted from the data payload.

Next, method 1200 includes determining whether the range of LBAs in the command (i.e., write request) is within a known extent as shown in decision block 1206. If so, flow proceeds to block 1208 where the LBAs are associated with the known extent, and I/O operations are treated in the same manner in terms of selection of FTL workflow.

Further, method 1200 includes selection of an appropriate FTL workflow or operation for the identified known extent in block 1210. For example, the FTL workflow might optimize short program operations since data retention is expected to be low, or might route these writes to blocks with specific P/E values based on the likelihood of the data becoming obsolete in a short amount of time. This improves performance and endurance, especially in SSDs that use low-endurance memory such as QLC. Once the FTL workflow is selected, method 1200 proceeds to block 1212 for execution of the FTL workflow. As used herein, an FTL workflow or FTL operation refers to a function or algorithm performed by the FTL. Example FTL workflows include wear-leveling, compaction (e.g., garbage collection), relocation of data (e.g., from SLC to MLC/QLC blocks or vice versa), read look ahead (e.g., where expected reads may be done ahead of time and stored in internal RAM of host issuing the read commands) separating out extents and treating them as a separate stream, possibly together with the associated metadata, reordering extents such that extents are marked in the order specified by the virtual cluster numbers (VCNs) in an MFT table, and other functions known to be performed by an FTL.

If the LBA range is determined to not be part of a known extent at decision block 1206, flow instead proceeds to decision block 1214 where a determination is made using one or more of the methods described in the flows illustrated in FIGS. 3-6, 8 and/or 9, whether the payload or LBAs in the command would indicate a file system update. If a file system update is indicated, the extent map is updated as shown in block 1216 and then flow proceeds to block 1212 for execution of the FTL workflow. Alternatively, if a file system update is not indicated as determined in block 1214, then an FTL workflow is selected based on known or legacy behavior as shown at block 1218.

In an aspect, it is noted that the processes of blocks 1214 and 1216 are a type of training or learning processes. That is, the process includes a determination of a new or unknown extent, and then updating or revising an extent map to include the LBA range of the write command in the extent map.

In other aspects, it is noted that the methodology of FIG. 12 provides for prioritization of FTL operations based on region writes derived from file system metadata. The file system analyzer 1118, for example, parses the file system metadata in order to get a list of groups or clusters of LBAs that belong to each file extent. File system metadata may also be parsed for hint derivation according to aspects described herein.

Furthermore, in addition to or in conjunction with the methodology disclosed herein, various methods to optimize internal operations of the data storage device (e.g., 1104) may also be employed. One method includes separating out extents and treating them as a separate stream together with the associated metadata in order to optimize known SSD memory device operations such as compaction, read look ahead, and relocation.

Another method includes reordering extents such that extents are marked in the order specified by the virtual cluster numbers (VCNs) in an MFT table. Re-ordering the extents allows the data storage device to know the order of data in the file so that the storage device can reorder aspects of the file (e.g., file sub-components or metadata) for optimal host access. Additionally, reordering aspects of the file may include storing the extents of the file in different memory blocks so that they can be read out in parallel. Also write in parallel can be achieved if the file system metadata is parsed dynamically during host writes In yet a further method that may be employed in the methodology herein, for data storage devices comprising a plurality of block-erasable memories (e.g., NAND memory), as well as a write-in-place (WiP) memory, an XOR engine may be utilized to generate XOR parity information that is used to recover data stored on the plurality of block-erasable memories and cause the generated XOR parity information to be stored to the WiP memory. In such case, a reordering of the file can be accomplished such that related extents are written to different NAND blocks in parallel, and the XOR parity is stored in WiP block on a per file basis.

In still one further method that may be employed in the methodology herein, for data storage devices comprised of only NAND blocks, the blocks can be opened or closed on per large file basis. In particular, generated XOR parity information may be stored in temporary SLC (XOR) blocks prior to a last logical word line of TLC blocks. Reordering of the file can be configured such that related extents are written to different NAND blocks in parallel, and the XOR parity is stored in XOR blocks on a per file basis. The temporary parity data of the XOR blocks can be swapped in and out of the XOR blocks easily during switching of open blocks, i.e., switching among different files.

Figure 13:
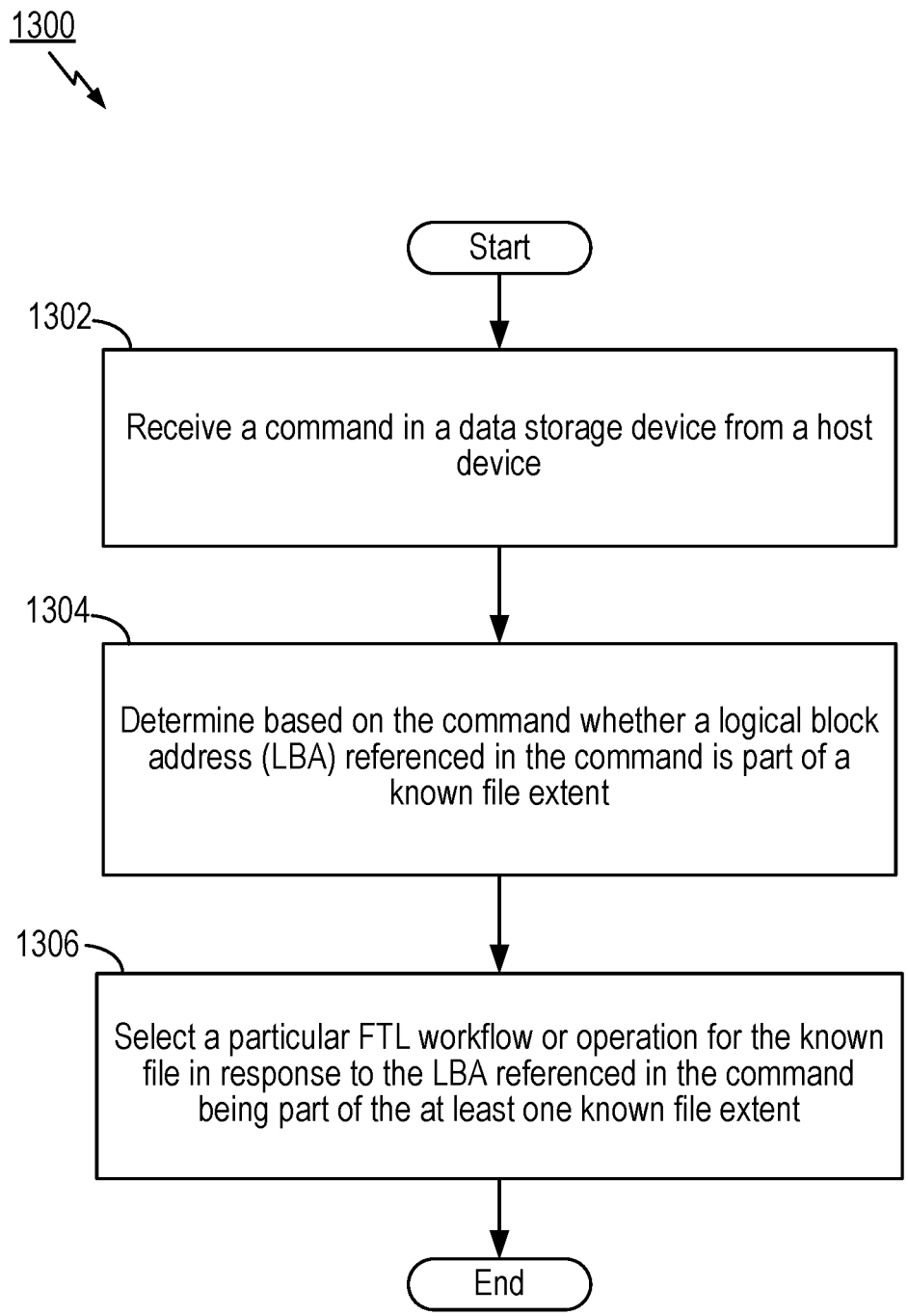
FIG. 13 is a flow chart illustrating another exemplary process for parsing file names in a master file table according to an embodiment of the subject matter described herein.

FIG. 13 illustrates a method 1300 for control of a data storage device including non-volatile memory according to further aspects of the disclosure. As illustrated, method 1300 includes receiving a command in a data storage device from a host device as illustrated in block 1302. The processes of block 1302 may include receiving a command from the host device to write to a non-volatile memory (NVM) in the data storage device, where the command is routed via a data path in the data storage device that includes a flash translation layer (FTL), such as is illustrated in FIG. 11. After receipt of the command, method 1300 includes determining from the command whether a logical block address (LBA) associated with the command is part of a known file extent as shown in block 1304. In an aspect, the determination in block 1304 may be accomplished with a controller (e.g., controller 1108 in FIG. 11), and further with the FTL manager 1116 in one implementation.

Additionally, method 1300 includes selecting a particular FTL operation for the known file extent if the LBAs associated with or referenced in the command are part of the known file extent as illustrated in block 1304.

In other aspects, it is noted that the processes of block 1302, 1304, and 1306 may be effectuated by various means including the file system analyzer 1118 in some other examples, or file system analyzer 1410 in FIG. 14 (to be discussed below), or equivalents thereof. The various means can include, for example, a means for receiving a command in a data storage device from a host device, means for determining from the command whether a logical block address (LBA) associated with the command is part of a known file extent, and means for selecting a particular FTL operation (or FTL workflow) for the known file extent if the LBAs associated with or referenced in the command are part of the known file extent. In one aspect, the means for determining whether the LBA is part of the known file extent includes means for parsing file system metadata to obtain a list of one or more LBA groupings within the known file extent. In one aspect, these means can further include means for dynamically parsing the file system metadata as the write command is received in the data path in the SSD and/or means for statically parsing file system representations of the file system stored in the non-volatile memory.

Additional Systems for Optimizing FTL Operations

Figure 14:
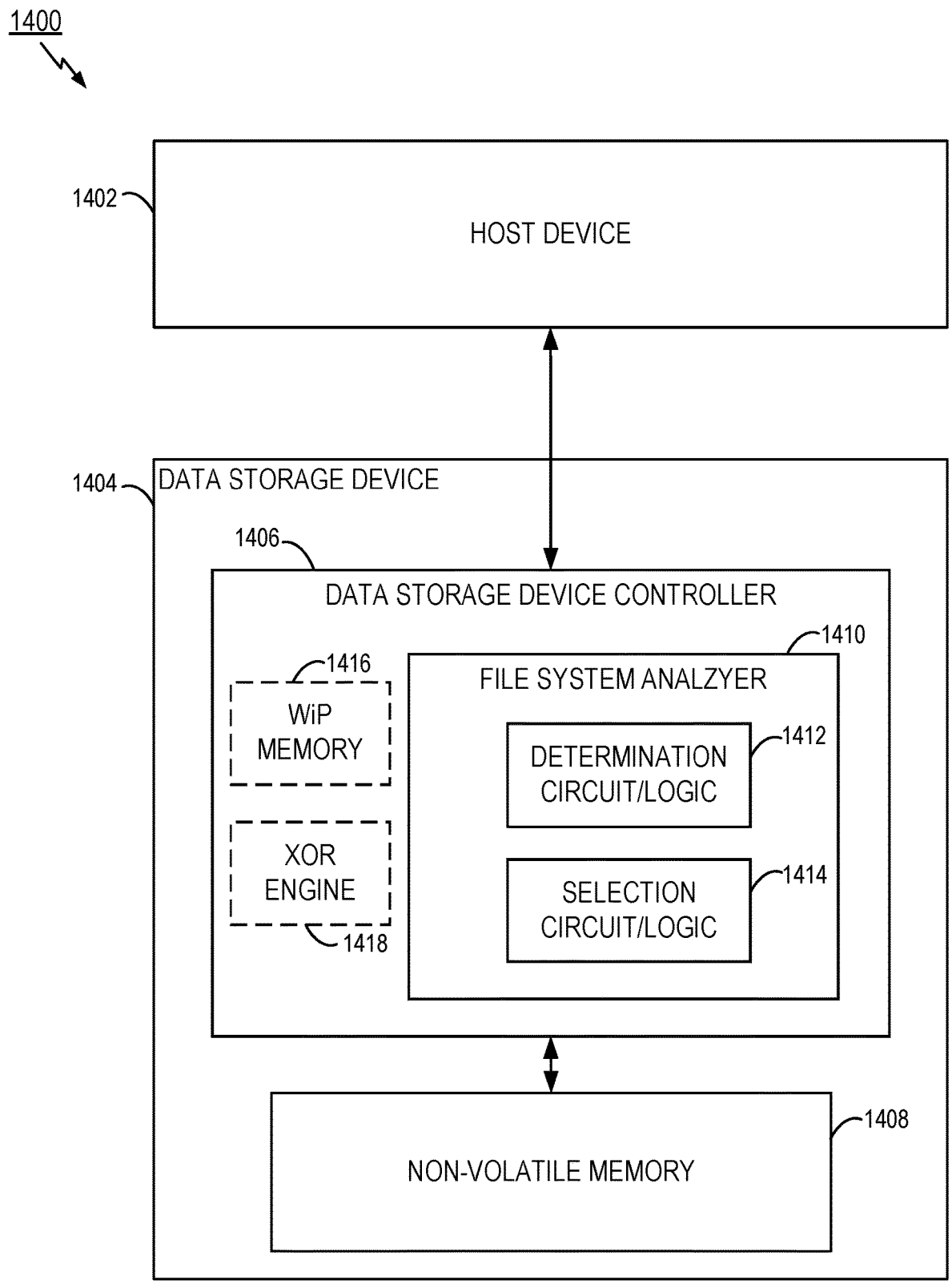
FIG. 14 illustrates a block diagram of another example of a system in which the disclosed methodologies may be implemented.

FIG. 14 illustrates a block diagram of another example of a system 1400 in which the disclosed methodologies may be implemented. As illustrated, system 1400 includes a host device 1402 coupled with a memory device 1404, such as an SSD. Within the memory device 1404, the device is organized to include a memory device controller 1406 that is configured to control various operations of a non-volatile memory 1408, such as a flash memory array. The memory device controller 1406 may include hardware, software, and firmware components that control access by host device 1402 to the non-volatile memory 1408.

Furthermore, the data storage device controller 1406 may include a file system analyzer 1410. The file system analyzer 1410, which may be implemented in firmware, hardware, software, or combinations thereof, includes determination logic 1412 that is configured to determine, during receipt of a command from host device 1402 such as a write command accessing the non-volatile memory 1408, whether a logical block address (LBA) referenced in the command is part of a known file extent having at least one range of LBAs. The file system analyzer 1410 further includes selection logic 1414 configured to select a flash translation layer (FTL) workflow, or FTL operation, for the file extent if the LBA referenced in the command is part of the known file extent, having the at least one range of LBAs. In one aspect, the host device 1402 may include an operating system using a plurality of file extents. In one aspect, the plurality of file extents may include the known file extent. In one aspect, the controller 1406 may be further configured to determine whether host device 1402 is updating a file system based on at least one of a payload of the command and a range of the logical block addresses (LBAs) referenced in the command, and to update an extent map when the file system is updated.

According to other certain aspects, the data storage device controller 1406 may include a write-in-place (WiP) memory 1416 and an XOR engine 1418, as were discussed earlier. The XOR engine 1418 may be utilized to generate XOR parity information that is used to recover data stored on the plurality of block-erasable memories and cause the generated XOR parity information to be stored to the WiP memory 1416.

Additional Aspects

As will be appreciated by those skilled in the art, the subject matter described herein can be implemented in any suitable NAND flash memory, including 2D or 3D NAND flash memory. Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magneto-resistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array, NAND and NOR memory configurations are exemplary, and memory elements may be otherwise configured.

The semiconductor memory elements located within and/or over a substrate may be arranged in two or three dimensions, such as a two dimensional memory structure or a three dimensional memory structure.

In a two dimensional memory structure, the semiconductor memory elements are arranged in a single plane or a single memory device level. Typically, in a two dimensional memory structure, memory elements are arranged in a plane (e.g., in an x-z direction plane) that extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and word lines.

A three dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in the y direction) with each column having multiple memory elements in each column. The columns may be arranged in a two dimensional configuration, e.g., in an x-z plane, resulting in a three dimensional arrangement of memory elements with elements on multiple vertically stacked memory planes. Other configurations of memory elements in three dimensions can also constitute a three dimensional memory array.

By way of non-limiting example, in a three dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

Typically, in a monolithic three dimensional memory array, one or more memory device levels are formed above a single substrate. Optionally, the monolithic three dimensional memory array may also have one or more memory layers at least partially within the single substrate. As a non-limiting example, the substrate may include a semiconductor such as silicon. In a monolithic three dimensional array, the layers constituting each memory device level of the array are typically formed on the layers of the underlying memory device levels of the array. However, layers of adjacent memory device levels of a monolithic three dimensional memory array may be shared or have intervening layers between memory device levels.

Two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that the subject matter described herein is not limited to the two dimensional and three dimensional exemplary structures described but cover all relevant memory structures within the spirit and scope of the subject matter as described herein and as understood by one of skill in the art.

The examples set forth herein are provided to illustrate certain concepts of the disclosure. The apparatus, devices, or components illustrated above may be configured to perform one or more of the methods, features, or steps described herein. Those of ordinary skill in the art will comprehend that these are merely illustrative in nature, and other examples may fall within the scope of the disclosure and the appended claims. Based on the teachings herein those skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein.

Aspects of the present disclosure have been described above with reference to schematic flowchart diagrams and/or schematic block diagrams of methods, apparatus, systems, and computer program products according to embodiments of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a computer or other programmable data processing apparatus to produce a machine, such that the instructions, which execute via the processor or other programmable data processing apparatus, create means for implementing the functions and/or acts specified in the schematic flowchart diagrams and/or schematic block diagrams block or blocks.

The subject matter described herein may be implemented in hardware, software, firmware, or any combination thereof. As such, the terms "function," "module," and the like as used herein may refer to hardware, which may also include software and/or firmware components, for implementing the feature being described. In one example implementation, the subject matter described herein may be implemented using a computer readable medium having stored thereon computer executable instructions that when executed by a computer (e.g., a processor) control the computer to perform the functionality described herein. Examples of computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures. Although various arrow types and line types may be employed in the flowchart and/or block diagrams, they are understood not to limit the scope of the corresponding embodiments. For instance, an arrow may indicate a waiting or monitoring period of unspecified duration between enumerated steps of the depicted embodiment.

The various features and processes described above may be used independently of one another, or may be combined in various ways. All possible combinations and sub-combinations are intended to fall within the scope of this disclosure. In addition, certain method, event, state or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other suitable manner. Tasks or events may be added to or removed from the disclosed example embodiments. The example systems and components described herein may be configured differently than described. For example, elements may be added to, removed from, or rearranged compared to the disclosed example embodiments.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The word "exemplary" is used herein to mean "serving as an example, instance, or illustration." Any aspect described herein as "exemplary" is not necessarily to be construed as preferred or advantageous over other aspects. Likewise, the term "aspects" does not require that all aspects include the discussed feature, advantage or mode of operation.

While the above descriptions contain many specific embodiments of the invention, these should not be construed as limitations on the scope of the invention, but rather as examples of specific embodiments thereof. Accordingly, the scope of the invention should be determined not by the embodiments illustrated, but by the appended claims and their equivalents. Moreover, reference throughout this specification to "one embodiment," "an embodiment," or similar language means that a particular feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment, but mean "one or more but not all embodiments" unless expressly specified otherwise.

The terminology used herein is for the purpose of describing particular aspects only and is not intended to be limiting of the aspects. As used herein, the singular forms "a," "an" and "the" are intended to include the plural forms as well (i.e., one or more), unless the context clearly indicates otherwise. An enumerated listing of items does not imply that any or all of the items are mutually exclusive and/or mutually inclusive, unless expressly specified otherwise. It will be further understood that the terms "comprises," "comprising," "includes" "including," "having," an variations thereof when used herein mean "including but not limited to" unless expressly specified otherwise. That is, these terms may specify the presence of stated features, integers, steps, operations, elements, or components, but do not preclude the presence or addition of one or more other features, integers, steps, operations, elements, components, or groups thereof. Moreover, it is understood that the word "or" has the same meaning as the Boolean operator "OR," that is, it encompasses the possibilities of "either" and "both" and is not limited to "exclusive or" ("XOR"), unless expressly stated otherwise. It is also understood that the symbol "/" between two adjacent words has the same meaning as "or" unless expressly stated otherwise. Moreover, phrases such as "connected to," "coupled to" or "in communication with" are not limited to direct connections unless expressly stated otherwise.

Any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be used there or that the first element must precede the second element in some manner. Also, unless stated otherwise a set of elements may include one or more elements. In addition, terminology of the form "at least one of A, B, or C" or "A, B, C, or any combination thereof" used in the description or the claims means "A or B or C or any combination of these elements." For example, this terminology may include A, or B, or C, or A and B, or A and C, or A and B and C, or 2A, or 2B, or 2C, or 2A and B, and so on. As a further example, "at least one of: A, B, or C" is intended to cover A, B, C, A-B, A-C, B-C, and A-B-C, as well as multiples of the same members (e.g., any lists that include AA, BB, or CC) Likewise, "at least one of: A, B, and C" is intended to cover A, B, C, A-B, A-C, B-C, and A-B-C, as well as multiples of the same members. Similarly, as used herein, a phrase referring to a list of items linked with "and/or" refers to any combination of the items. As an example, "A and/or B" is intended to cover A alone, B alone, or A and B together. As another example, "A, B and/or C" is intended to cover A alone, B alone, C alone, A and B together, A and C together, B and C together, or A, B, and C together.

As used herein, the term "determining" encompasses a wide variety of actions. For example, "determining" may include calculating, computing, processing, deriving, investigating, looking up (e.g., looking up in a table, a database or another data structure), ascertaining, and the like. Also, "determining" may include receiving (e.g., receiving information), accessing (e.g., accessing data in a memory), and the like. Also, "determining" may include resolving, selecting, choosing, establishing, and the like.

As used herein, the term "deriving" encompasses a wide variety of actions. For example, "deriving" may include calculating, computing, processing, determining, investigating, looking up (e.g., looking up in a table, a database or another data structure), ascertaining, and the like. Also, "deriving" may include receiving (e.g., receiving information), accessing (e.g., accessing data in a memory), and the like. Also, "deriving" may include resolving, selecting, choosing, establishing, and the like.

What is claimed is:

1. A data storage device comprising:
   a non-volatile memory comprising a flash memory;
   a data storage device controller coupled to the non-volatile memory and configured to receive a command from a host device; and
   wherein the data storage device controller comprises a file system analyzer comprising:
      a determination circuit configured to determine based on the command from the host device whether a logical block address (LBA) referenced in the command is part of a known file extent, wherein the known file extent is a contiguous area of storage in the non-volatile memory reserved for a file in a file system of the host device, wherein the known file extent comprises a block offset and a length within the file; and
      a selection circuit configured to select a flash translation layer (FTL) workflow for the file extent in response to the determination that the LBA referenced in the command is part of the known file extent,
      wherein the FTL workflow comprises at least one of a wear-leveling process, a garbage collection process, a relocation of data process, a read look ahead process, a process for segmenting file extents, or a process for reordering file extents; and
   wherein the file system analyzer is further configured to:
      maintain an extent map of one or more file extents;
      determine whether a file system update is indicated from at least one of a payload of the command or a range of the logical block addresses (LBAs) referenced in the command; and
      update the extent map responsive to the file system update being indicated.

2. The data storage device of claim 1, wherein the determination circuit is further configured to parse file system metadata to obtain a list of one or more clusters of logical block addresses (LBAs) that belong to the file extent.

3. The data storage device of claim 2, wherein the determination circuit is further configured to, at least one of, dynamically parse the file system metadata as the command is received in a data path of the data storage device or parse file system representations of a file system stored in the non-volatile memory.

4. The data storage device of claim 1, wherein the determination circuit is further configured to determine whether the LBA is part of the known file extent based on file system data extracted by the determination circuit from a payload of the command from the host device.

5. The data storage device of claim 1, the data storage device controller further comprising:
   a write-in-place (WiP) memory; and
   an exclusive OR (XOR) engine configured to generate XOR parity information for recovering data stored in the non-volatile memory, and to store the generated XOR parity information in the WiP memory.

6. The data storage device of claim 5, wherein the data storage device controller is further configured to reorder a file system such that related extents are written in parallel to different NAND blocks of the non-volatile memory, and the XOR parity information is stored in the WiP memory on a per file basis.

7. The data storage device of claim 5:
wherein the non-volatile memory comprises a plurality of NAND blocks each configured to be opened or closed for memory operations on a per file basis; and
wherein the XOR engine is configured to swap temporary parity data in and out of XOR blocks in response to switching between open blocks of the plurality of NAND blocks that correspond to different files.

8. The data storage device of claim 1, wherein the known file extent is only a portion of the file.

9. The data storage device of claim 1, wherein the file system analyzer is further configured to determine the extent map of the one or more file extents, the extent map comprising the known file extent.

10. A data storage device comprising:
a flash memory; and
a data storage device controller coupled to the flash memory and configured to:
receive a command from a host device accessing the flash memory;
determine from the command whether logical block addresses (LBAs) referenced in the command are within a known file extent having an associated range of LBAs, wherein the known file extent is a contiguous area of storage in the flash memory reserved for a file in a file system of the host device, wherein the known file extent comprises a block offset and a length within the file;
select a particular operation used by a flash translation layer (FTL) manager in the data storage device controller for controller operations for the known file extent when the LBAs referenced in the command are determined to be within the known file extent;
maintain an extent map of one or more file extents;
determine whether a file system update is indicated from at least one of a payload of the command or a range of the logical block addresses (LBAs) referenced in the command; and
update the extent map responsive to the file system update being indicated,
wherein the particular operation comprises at least one of a wear-leveling process, a garbage collection process, a relocation of data process, a read look ahead process, a process for segmenting file extents, or a process for reordering file extents.

11. The data storage device of claim 10, wherein the data storage device controller is further configured to determine whether an LBA is part of the known file extent by parsing file system metadata to obtain a list of one or more clusters that belong to the file extent.

12. The data storage device of claim 11, wherein the storage device controller is further configured to, at least one of, dynamically parse the file system metadata as the command is received in a data path of the data storage device or parse file system representations of a file system stored in the flash memory.

13. The data storage device of claim 10, wherein the data storage device controller is configured to reorder a plurality of extents in an order specified by virtual cluster numbers in a master file table (MFT) maintained by the data storage device controller.

14. The data storage device of claim 10, wherein the data storage device controller is further configured to separate out at least one extent and treat the separated extent as a separate stream together with associated metadata.

15. The data storage device of claim 10, wherein the data storage device controller is configured to reorder extents including marking extents in an order specified by virtual cluster numbers in a master file table (MFT) maintained by the FTL manager.

16. A method comprising:
receiving a command in a data storage device from a host device;
determining from the command whether a logical block address (LBA) associated with the command is part of a known file extent, wherein the known file extent is a contiguous area of storage in a non-volatile memory of the data storage device reserved for a file in a file system of the host device, wherein the known file extent comprises a block offset and a length within the file;
selecting a particular flash translation layer (FTL) operation for the known file extent in response to the known file extent comprising the LBA associated with the command; and
maintaining an extent map of one or more file extents by determining from at least one of a payload of the command or a range of the logical block addresses (LBAs) referenced in the command that a file system update is indicated,
wherein the particular FTL operation comprises at least one of a wear-leveling process, a garbage collection process, a relocation of data process, a read look ahead process, a process for segmenting file extents, or a process for reordering file extents, and
wherein the non-volatile memory comprises a flash memory.

17. The method of claim 16, further comprising determining whether the LBA is part of the known file extent by parsing file system metadata to identify a group of LBAs that belong to the known file extent.

18. The method of claim 17, further comprising at least one of dynamically parsing the file system metadata as the command is received in the data storage device or parsing file system representations of a file system stored in a non-volatile memory within the data storage device.

19. The method of claim 16, wherein the determining comprises determining whether the LBA is part of the known file extent based on file system data extracted from a payload of the command.

20. A solid state device (SSD) comprising:
means for receiving a write command from a host device;
means for determining, upon receipt of the write command, whether a logical block address (LBA) referenced in the write command is part of a known file extent, wherein the known file extent is a contiguous area of storage in a non-volatile memory of the SSD reserved for a file in a file system of the host device, wherein the known file extent comprises a block offset and a length within the file;
means for selecting a workflow for the known file extent if the LBA referenced in the command is part of the known file extent; and
means for maintaining an extent map of one or more file extents by determining from at least one of a payload of the command or a range of the logical block addresses (LBAs) referenced in the command that a file system update is indicated,
wherein the workflow comprises at least one of a wear-leveling process, a garbage collection process, a relocation of data process, a read look ahead process, a process for segmenting file extents, or a process for reordering file extents.

* * * * *